(12) United States Patent
Aikawa et al.

(10) Patent No.: US 8,601,032 B2
(45) Date of Patent: Dec. 3, 2013

(54) IMAGE FORMING APPARATUS, DISPLAY CONTROL METHOD, AND RECORDING MEDIUM

(75) Inventors: Tomonori Aikawa, Tokyo (JP); Kengo Matsuyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 568 days.

(21) Appl. No.: 12/787,723

(22) Filed: May 26, 2010

(65) Prior Publication Data

US 2011/0022631 A1    Jan. 27, 2011

(30) Foreign Application Priority Data

Jul. 27, 2009 (JP) ................................. 2009-174610

(51) Int. Cl.
*G06F 17/30* (2006.01)

(52) U.S. Cl.
USPC ........................................................ 707/803

(58) Field of Classification Search
USPC ........................................ 707/803, 805, 809
See application file for complete search history.

(56) References Cited

U.S. PATENT DOCUMENTS

| | | | |
|---|---|---|---|
| 6,778,532 B1* | 8/2004 | Akahane et al. | 370/392 |
| 2002/0016736 A1* | 2/2002 | Cannon et al. | 705/14 |
| 2005/0198679 A1* | 9/2005 | Baran et al. | 725/88 |
| 2006/0034313 A1* | 2/2006 | Aaltonen | 370/432 |
| 2006/0262795 A1* | 11/2006 | Mamillapalli et al. | 370/390 |
| 2007/0050472 A1* | 3/2007 | Cha | 709/217 |
| 2007/0183448 A1* | 8/2007 | Ochiai | 370/463 |
| 2009/0077164 A1* | 3/2009 | Phillips et al. | 709/203 |

FOREIGN PATENT DOCUMENTS

| | | |
|---|---|---|
| JP | 2001-331396 A | 11/2001 |
| JP | 2005-276079 | 10/2005 |
| JP | 2006-340286 | 12/2006 |
| JP | 2007-48056 A | 2/2007 |
| JP | 2007-214654 A | 8/2007 |
| JP | 2008-97368 | 4/2008 |
| JP | 2008-257708 A | 10/2008 |
| JP | 2008-311947 | 12/2008 |

OTHER PUBLICATIONS

Office Action issued on Feb. 12, 2013, in Japanese Patent Application No. 2009-174610.

* cited by examiner

*Primary Examiner* — Ajay Bhatia
*Assistant Examiner* — Fatima Mina
(74) *Attorney, Agent, or Firm* — Oblon, Spivak, McClelland, Maier & Neustadt, L.L.P.

(57) ABSTRACT

An image forming apparatus is disclosed including a search request transmission unit transmitting a search request to a predetermined resource in a network, a response receiving unit receiving response information in response to the search request, and storing the received response information in a storage unit, a list screen display control unit displaying a list screen including a display element corresponding to each response information stored in the storage unit within a first predetermined time period. When the list screen is changed to another screen and then changed back again to the list screen, the list screen display control unit displays the list screen including the display element corresponding to response information stored in the storage unit after the first predetermined time period has passed.

16 Claims, 22 Drawing Sheets

FIG.6

| WIDGET ID | scan001 |
|---|---|
| USER ID | USER A |
| WIDGET ADDRESS | http://xxx/xxx/yyy |
| DISPLAY NAME | SCAN |
| SERVICE ID | SCAN |
| SETTING INFORMATION | .... |
| : | : |

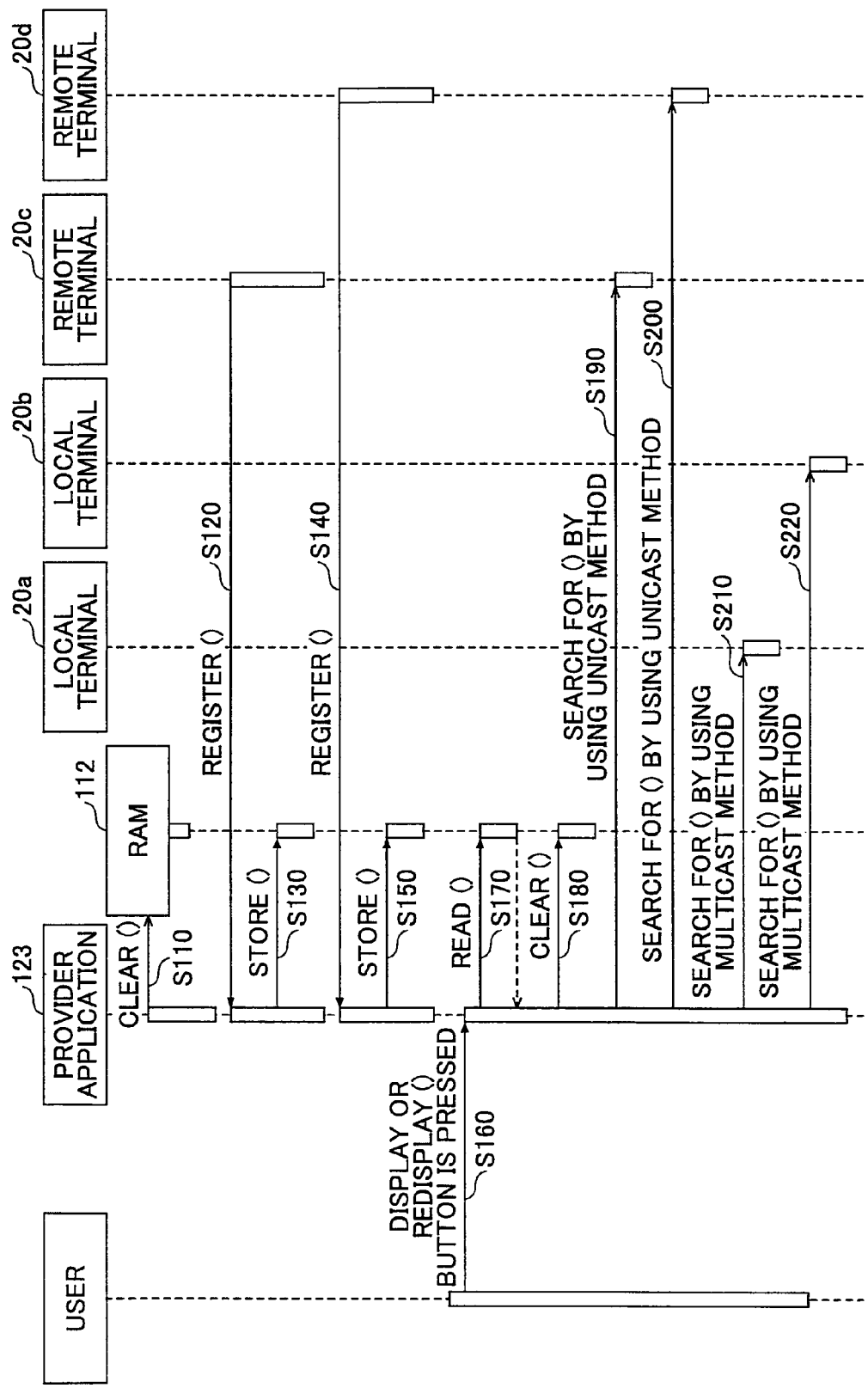

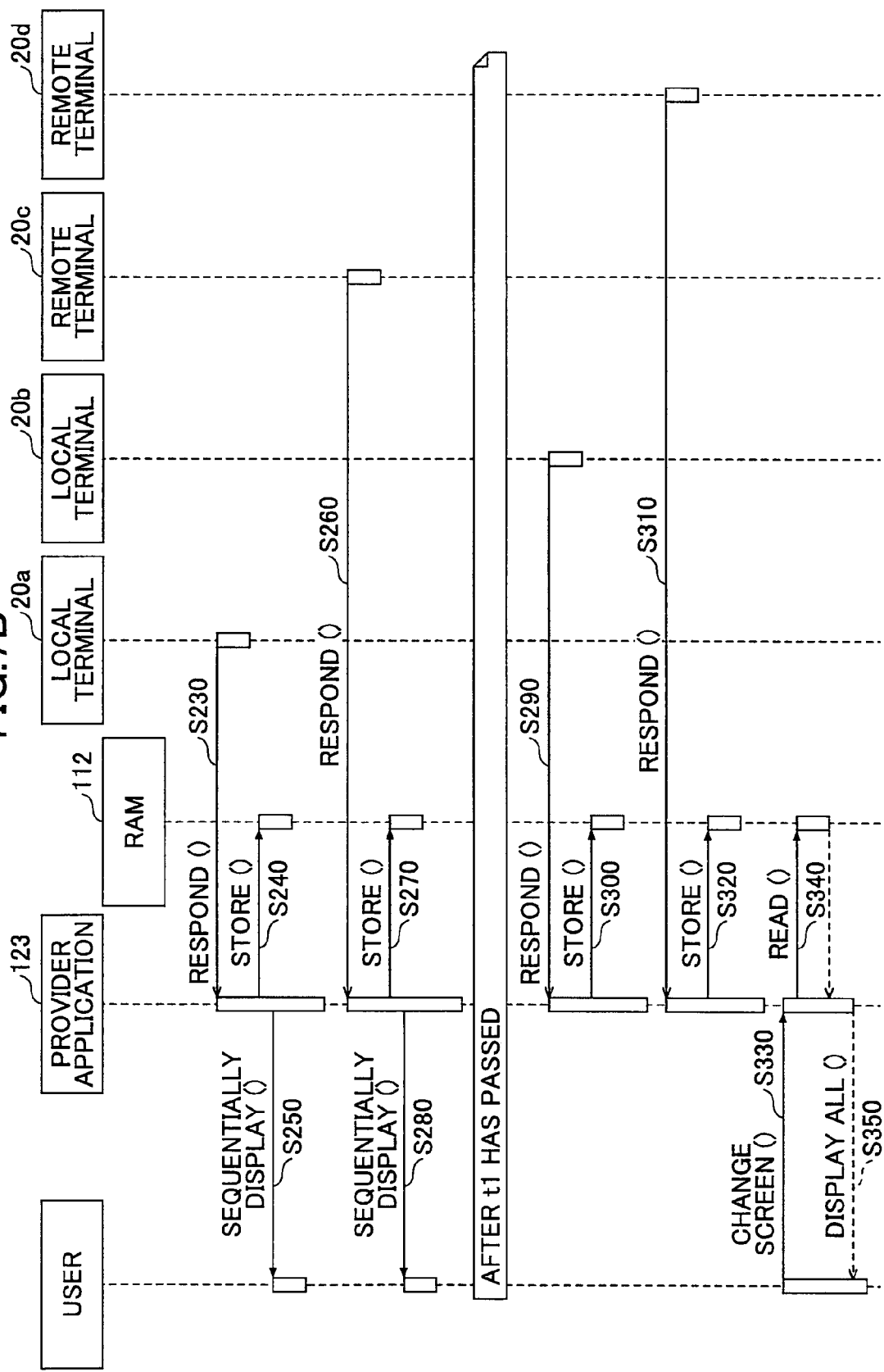

FIG.8

| IP ADDRESS |
| --- |
| xxx.xxx.xxx.xxx |
| xxx.xxx.xxx.xxx |

| USER ID | IP ADDRESS | URL FOR ACQUIRING WIDGET INFORMATION |
| --- | --- | --- |
| USER A | xxx.xxx.xxx.xxx | http://xxxxxxxxxxxx |
| USER C | xxx.xxx.xxx.xxx | ..... |
|  |  |  |

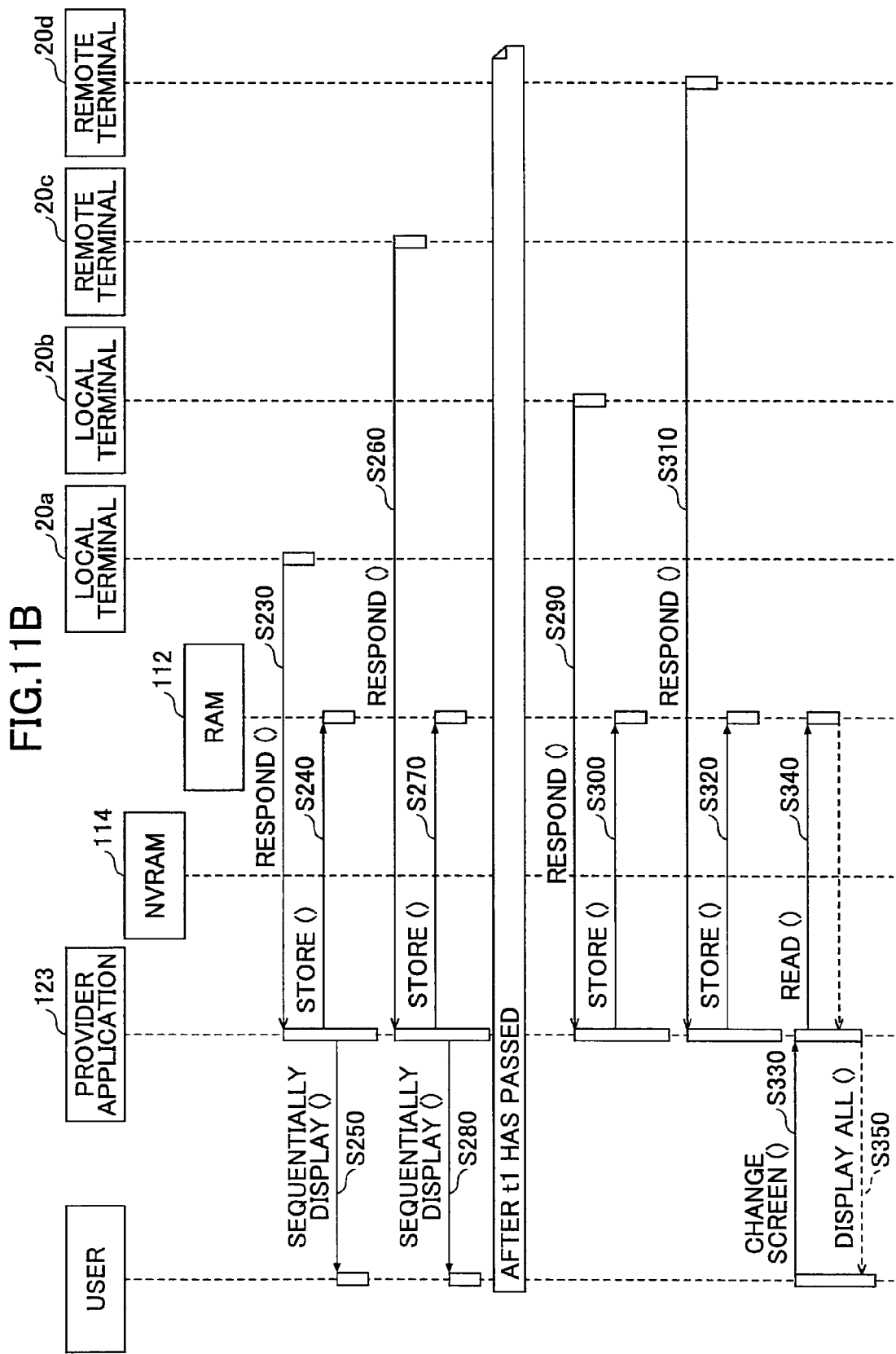

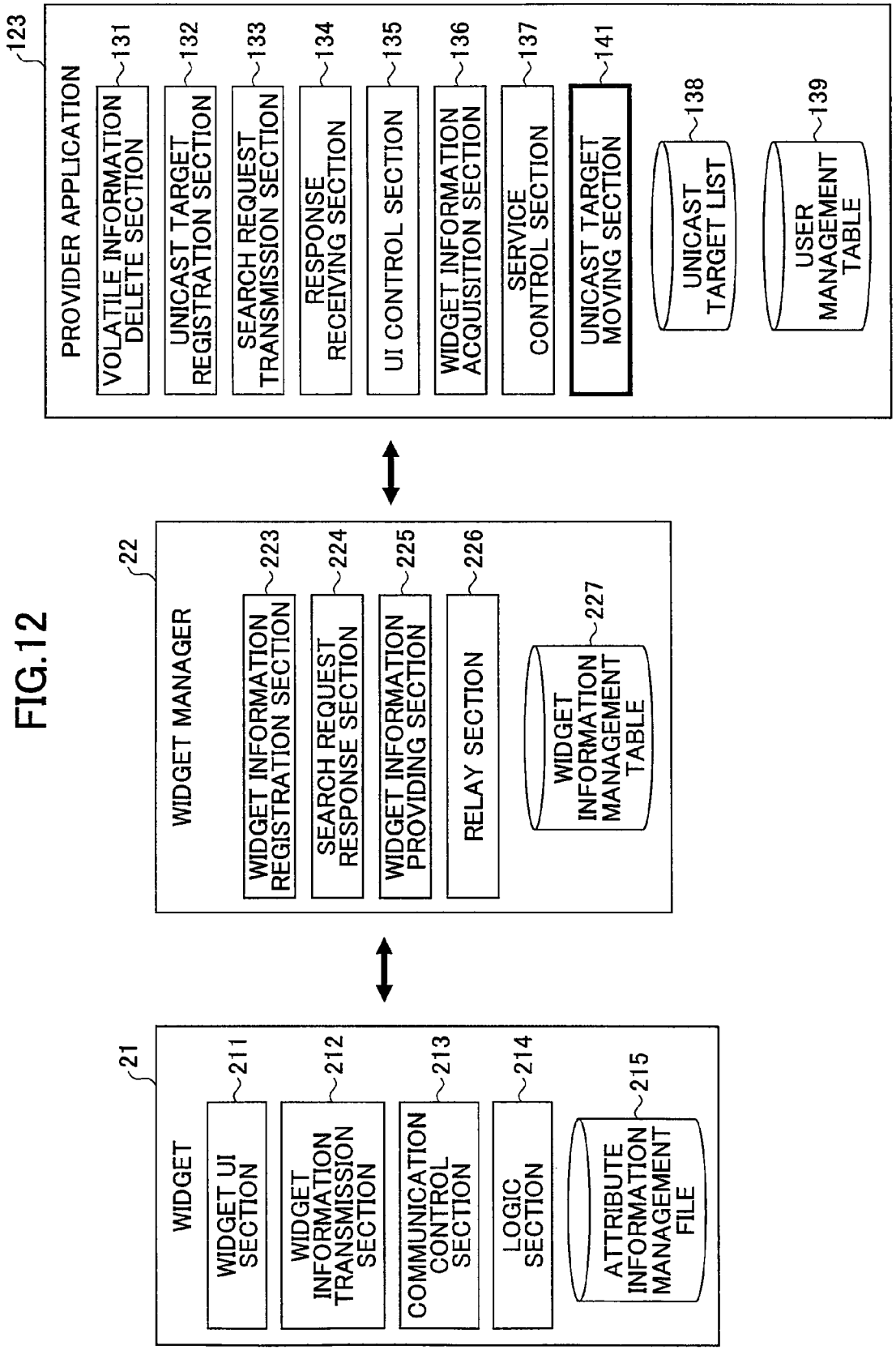

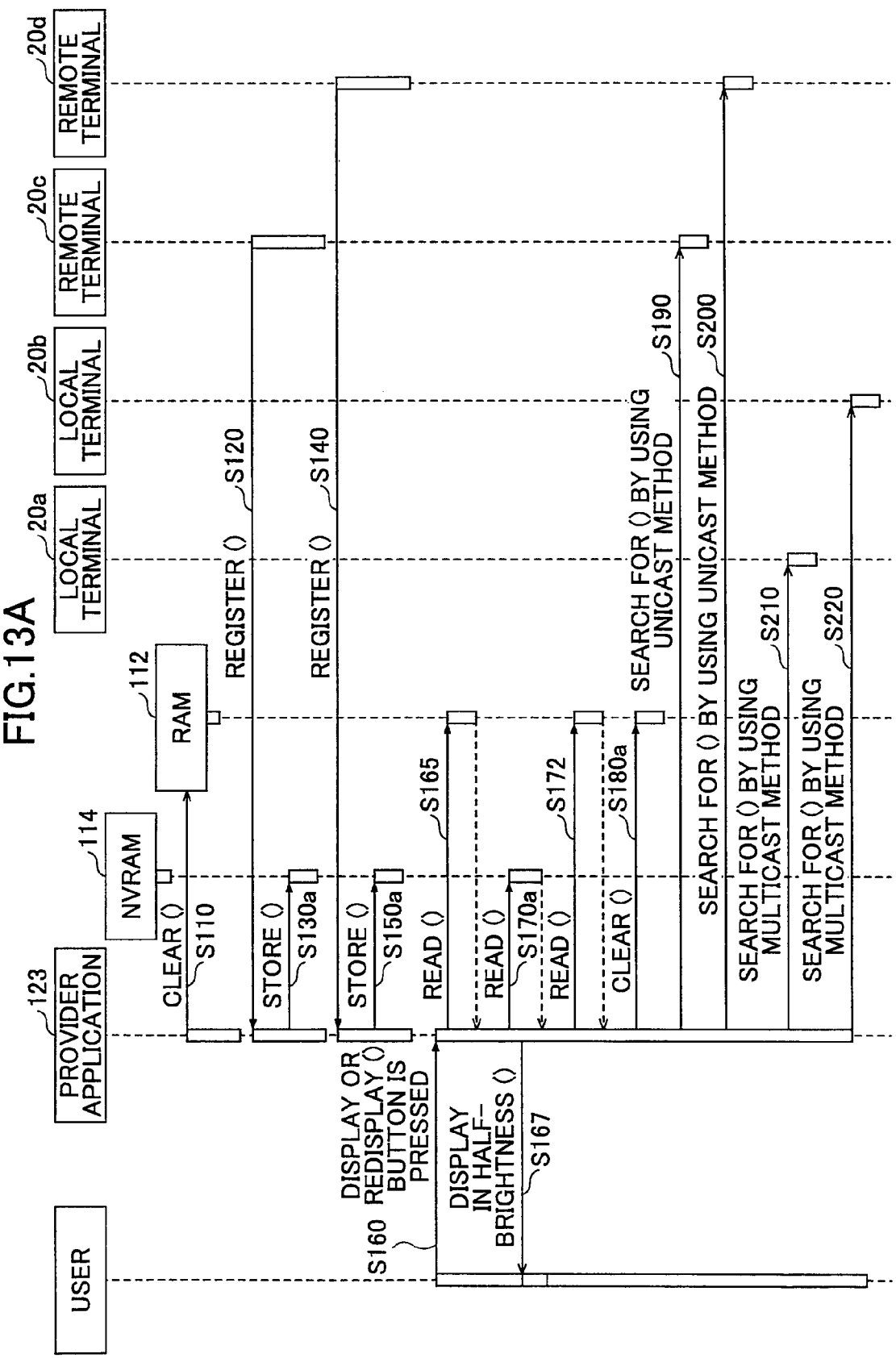

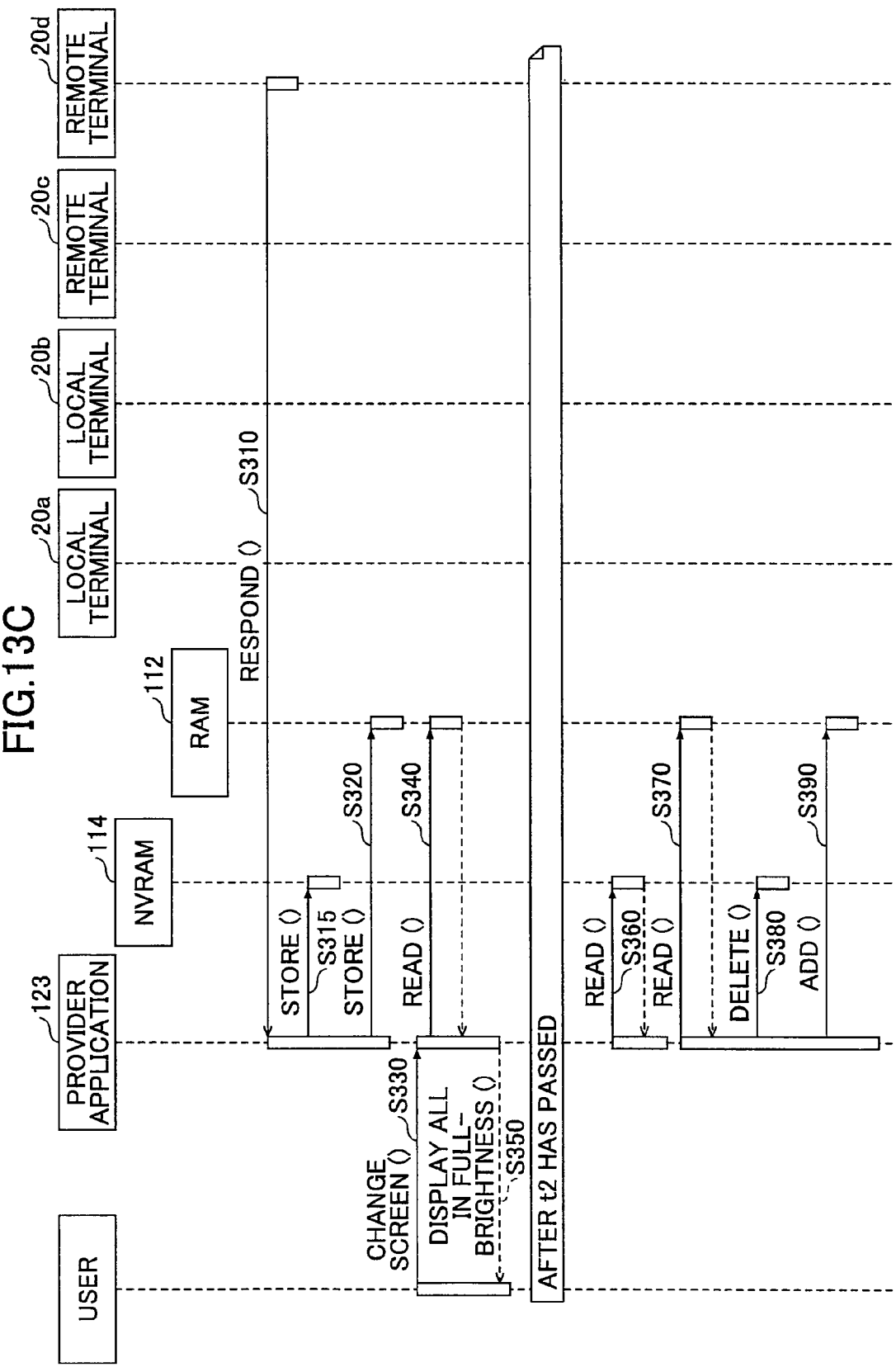

FIG.15

| USER ID | IP ADDRESS | URL FOR ACQUIRING WIDGET INFORMATION | DELAY FLAG |
|---|---|---|---|
| USER A | xxx.xxx.xxx.xxx | http://xxxxxxxxxxxx | OFF |
| USER C | xxx.xxx.xxx.xxx | ...... | OFF |
| USER B | xxx.xxx.xxx.xxx | ...... | ON |
| USER D | xxx.xxx.xxx.xxx | ...... | ON |
| | | | |

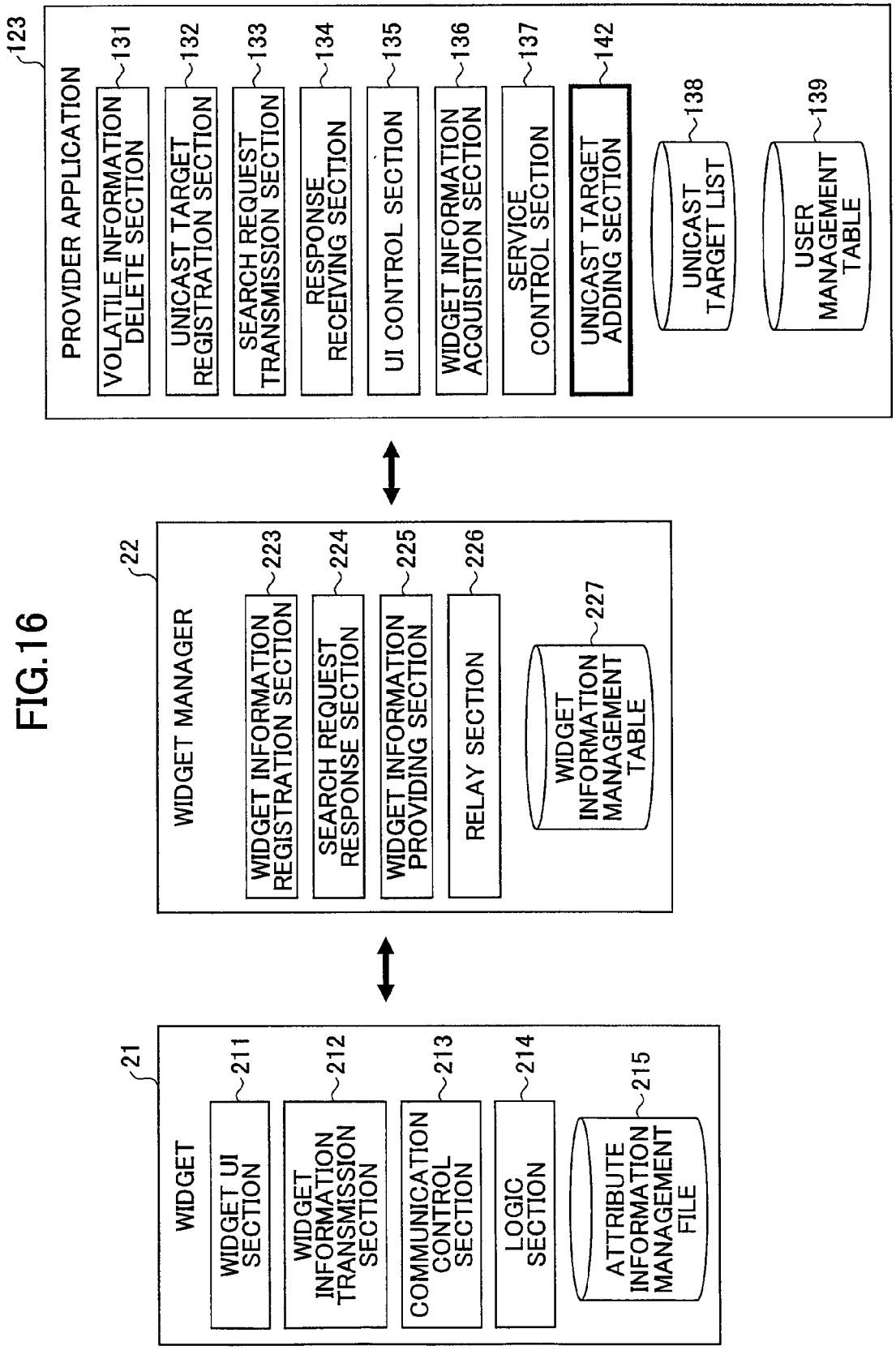

IMAGE FORMING APPARATUS, DISPLAY CONTROL METHOD, AND RECORDING MEDIUM

CROSS-REFERENCE TO RELATED APPLICATIONS

The present application claims priority under 35 U.S.C §119 based on Japanese Patent Application No. 2009-174610 filed Jul. 27, 2009, the entire contents of which are hereby incorporated herein by reference.

BACKGROUND OF THE INVENTION

1. Field of the Invention

The present invention generally relates to an image forming apparatus, a display control method, and a recording medium, and more particularly to an image processing apparatus and a display control method capable of displaying resources having been searched for in a network, and a recording medium storing a program of the display control method.

2. Description of the Related Art

Conventionally and continually, a search for a predetermined resource (e.g., a device) in a network has been conducted by using a broadcast address, multicast addresses or the like (see, for example, Japanese Patent Application Publication No. 2006-340286). Namely, a searching unit (that searches for a target to be searched for such as an information processing apparatus) transmits predetermined packet data to the devices specified by the broadcast address, the multicast addresses or the like. In this case, it is assumed that the target to be searched for is capable of detecting (recognizing) the predetermined packet data. As a response to the broadcast address, the multicast addresses or the like, the target to be searched for transmits a response to the searching unit. By detecting the response transmitted from the target to be searched for, the searching unit may detect (recognize) the existence of the target to be searched for in the network.

However, when there are plural targets to be searched for (hereinafter may be simplified as "target(s)") in the network, the received timings of the responses from the plural targets at the searching unit may vary depending on the network conditions, distances in the network between the searching unit and the targets and the like. Namely, for example, in a case where there are two targets A and B in the network, the response time from the target A may be different from that from the target B.

Because of the differences, in a case where the targets are to be displayed within a list screen, whenever a response from the target is received, the list screen may have to be updated (changed) by adding a display element representing the target. As a result, the contents displayed on the list screen may be sequentially (frequently) updated, which may make it difficult for a user to operate the list screen.

To solve the problem, there may be an idea that after the responses from all the targets are received, the screen is then displayed. However, it is fundamentally difficult to determine when the responses from all the targets are received. This is because, in the first place, the searching unit does not exactly know all of the targets to be searched for before searching for the targets.

SUMMARY OF THE INVENTION

The present invention is made in light of the above circumstances, and may provide an image forming apparatus, a display control method capable of appropriately displaying a screen showing searching-for results of the resources in the network, and a recording medium storing a program of the display control method.

To that end, according to an aspect of the present invention, there is provided an image forming apparatus including a search request transmission unit transmitting a search request to a predetermined resource in a network, a response receiving unit receiving response information in response to the search request and storing the received response information in a storage unit, a list screen display control unit causing a display unit to display a list screen including a display element corresponding to each response information stored in the storage unit within a first predetermined time period since the transmission of the search request. Further, when the list screen is changed to another screen and then changed back again to the list screen, the list screen display control unit causes the display unit to display the list screen in a manner such that the list screen includes the display element corresponding to response information stored in the storage unit after the first predetermined time period has passed.

By having the above configuration, the image forming apparatus may appropriately display searching-for results of the resources in the network.

BRIEF DESCRIPTION OF THE DRAWINGS

Other objects, features, and advantages of the present invention will become more apparent from the following description when read in conjunction with the accompanying drawings, in which:

FIG. 6 is a drawing showing an example of widget information of a scan widget;

FIGS. 7A and 7B are a sequence diagram illustrating a display process of displaying a user selection screen of the image forming apparatus according to the first embodiment of the present invention;

FIG. 8 is a drawing showing an example of a unicast target list;

FIG. 9 is a drawing showing an example of a user management table;

FIGS. 11A and 11B are a sequence diagram illustrating a display process of displaying a user selection screen of an image forming apparatus according to a second embodiment of the present invention;

FIG. 12 is an exemplary functional block diagram of the widget, the widget manager, and the provider application according to a third embodiment of the present invention;

FIGS. 13A through 13C are a sequence diagram illustrating a display process of displaying the user selection screen of an image forming apparatus according to the third embodiment of the present invention;

FIG. 15 is a drawing showing an example of a user management table according to the fourth embodiment of the present invention;

FIG. 16 is an exemplary functional block diagram of the widget, the widget manager, and the provider application according to a fifth embodiment of the present invention.

DETAILED DESCRIPTION OF THE PREFERRED EMBODIMENTS

In the following, embodiments of the present invention are described with reference to the accompanying drawings.

Figure 1:
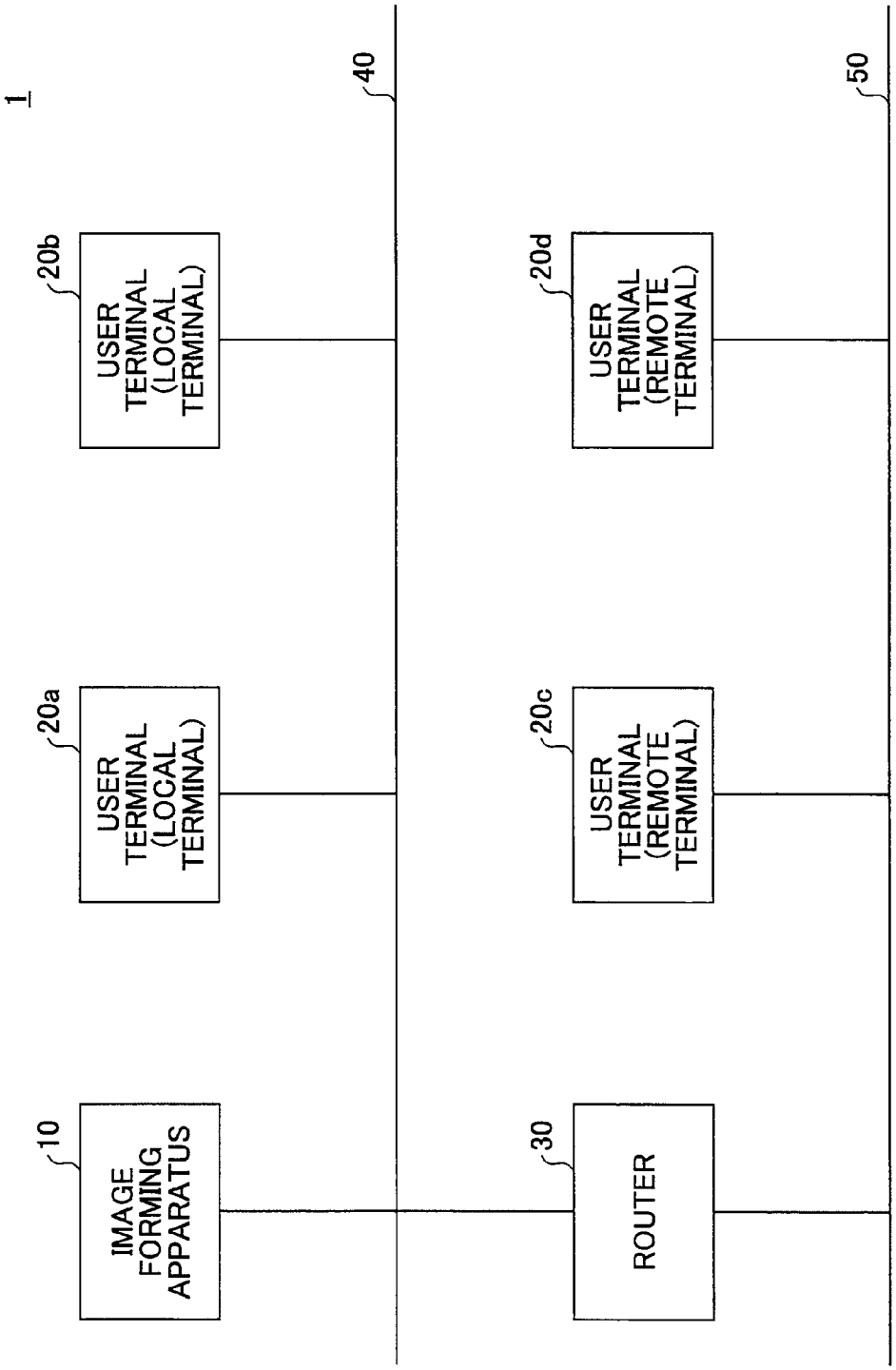
FIG. 1 is a drawing showing an exemplary configuration of an image processing system according to an embodiment of the present invention.

FIG. 1 shows an exemplary configuration of an information processing system 1 according to an embodiment of the present invention. As shown in FIG. 1, the information processing system 1 includes an image forming apparatus 10, and user terminals 20a through 20d, a router 30, and networks 40 and 50. The image forming apparatus 10 is connected to the user terminals 20a and 20b via the network 40 such as a LAN (Local Area Network). Further, the image forming apparatus 10 is connected to the user terminals 20c and 20d in the network 50 such as the LAN via the router 30. Namely, the user terminals 20a and 20b belong to the same segment (the same network) as that of the image forming apparatus 10 and the user terminals 20c and 20d belong to another segment (another network) other than the segment of the image forming apparatus 10. In this regard, the user terminals 20a and 20b may be called local terminals 20a and 20b, respectively; and the user terminals 20c and 20d may be called remote terminals 20c and 20d, respectively, as shown in FIG. 1. In this sense, the term "local" refers to within "the same segment", and the term "remote" refers to another segment other than the segment of the image forming apparatus 10. Further, when it is not particularly necessary to distinguish between the user terminals 20a through 20d, the term "user terminal(s) 20" may be collectively used. Further, each of the networks 40 and 50 may be either wireless or wired network.

The image forming apparatus 10 may be a so-called multifunction peripheral (MFP) having various functions (image forming functions) such as a printer, scanner, copier, facsimile machine and the like in the chassis. Otherwise, for example, the image forming apparatus 10 may be an apparatus having one of the above functions (i.e., a printer, scanner, copier, facsimile machine or the like).

The user terminal 20 may be a personal terminal to be operated by a user. The user terminal 20 is not limited to a specific device as long as a software program can be installed and executed and a communication function is included in the user terminal 20. For example, the user terminal 20 may be a desk top PC (Personal Computer), a laptop CP, a PDA (Personal Digital Assistance), an information processing apparatus such as a cellular phone or the like.

Figure 2:
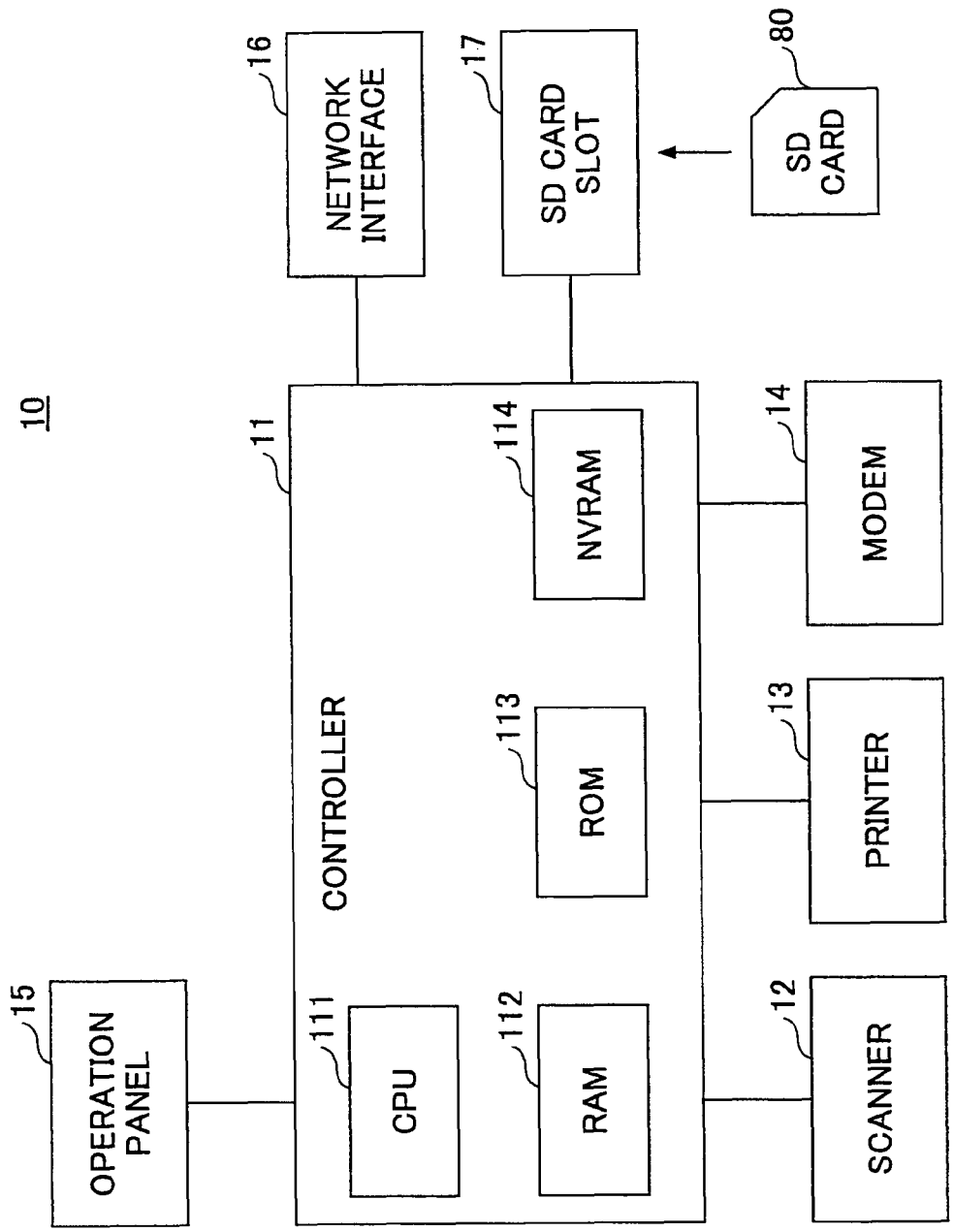
FIG. 2 is a drawing showing an exemplary hardware configuration of an image forming apparatus according to an embodiment of the present invention.

FIG. 2 shows an exemplary hardware configuration of the image forming apparatus 10 according to an embodiment of the present invention. As shown in FIG. 2, the image forming apparatus 10 includes a controller 11, a scanner 12, a printer 13, a modem 14, an operation panel 15, a network interface 16, an SD card slot 17 and the like.

The controller 11 includes a CPU (Central Processing Unit) 111, a RAM (Radom Access Memory) 112, a ROM (Read Only Memory) 113, and an NVRAM (Non-Volatile RAM) 114 and the like. The ROM 113 stores various programs, data for the programs and the like. The RAM 112 is an example of a volatile storage unit, and is used as a storage medium to which a program is loaded and as a work area of the loaded program. The CPU 111 performs various functions by executing the program loaded in the RAM 112. The NVRAM 114 is an example of a non-volatile storage unit, and stores programs and various data for the programs and the like. Instead of the NVRAM 114, any other type of the non-volatile storage medium such as an HDD (Hard Disk Drive) may be used as the non-volatile storage unit.

The scanner 12 is a hardware device to read out image data from a document. The printer 13 is a hardware device to print a print data on a printing sheet. The modem 14 is a hardware device to connect to a telephone line for transmitting and receiving image data in FAX communications. The operation panel 15 is a hardware device having an input means to receive an input operation (instruction) from a user, and a display means such as a liquid crystal panel. The network interface 16 is a hardware device to connect to a network such as the LAN (either wirelessly or using a cable). The SD card slot 17 is used to read out a program stored in an SD card 80. Namely, in the image forming apparatus 10, not only the program stored in the ROM 113 but also the program stored in the SD card 80 can be loaded to the RAM 112 to be executed.

Figure 3:
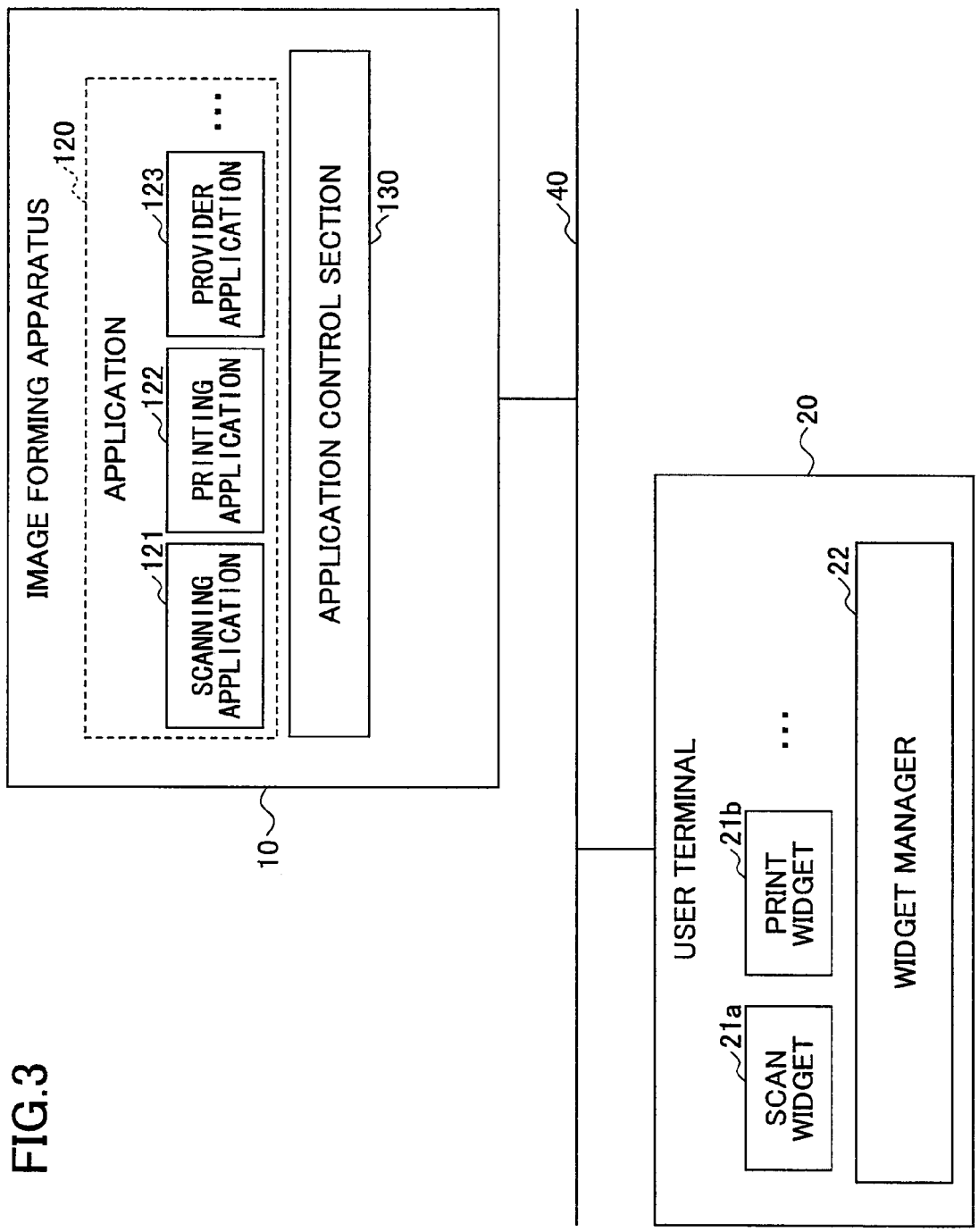
FIG. 3 is a drawing showing an exemplary software configuration of the image forming apparatus and a user terminal according to an embodiment of the present invention.

FIG. 3 shows an exemplary software configuration of the image forming apparatus 10 and the user terminal 20 according to an embodiment of the present invention, the image forming apparatus 10 being connected to the user terminal 20 via the network 40.

As shown in FIG. 3, the user terminal 20 includes a scan widget 21a, a print widget 21b, a widget manager 22 and the like. The scan widget 21a and the print widget 21b are application programs collectively called "a widget(s) 21" in the embodiment of the present invention. Recently, more and more simple and convenient programs called widgets or gadgets have been used. In the description, the application programs are called the widget(s) 21 in a sense that the application programs are simple and convenient. Therefore, it should be noted that the technical scope of the application programs is not to be limited because the term "widget(s)" is used. According to the embodiment of the present invention, the widgets 21 have the common feature in that the widgets 21 are capable of remotely using the functions of the image forming apparatus 10 so as to provide the respective services (e.g., a series of processing flow such as a workflow) to the user. For example, the scan widget 21a is the widget 21 that may cause the image forming apparatus 10 to execute a scanning process and store the scanned image data into the user terminal 20. On the other hand, the print widget 21b is the widget 21 that may cause the image forming apparatus 10 to print document data stored in the user terminal 20.

Further, the widget manager 22 is provided as a framework of the widgets 21 to mediate communications between the widgets 21 and the image forming apparatus 10. To that end, the widgets 21 are required to have an interface and perform a procedure determined by the widget manager 22. In other words, the application that is capable of cooperatively operating with the widget manager 22 is called the widget 21 in an embodiment of the present invention.

As shown in FIG. 3, the software of the image forming apparatus 10 includes an application 120 and an application control section 130. The application 120 is programs to execute a job requested by a user. In the case of FIG. 3, as an example, the application 120 includes a scanning application 121, a printing application 122, and a provider application 123. The scanning application 121 executes a scanning job. The printing application 122 executes a printing job. The provider application 123 executes a process for cooperation between the image forming apparatus 10 and the widgets 21. For example, the provider application 123 controls a process causing the image forming apparatus 10 to execute a process requested from the widget 21 to the image forming apparatus 10.

The application control section 130 performs arbitration (e.g. prioritization) among the applications 120. For example, the application control section 130 switches an active application 120 based on a user's instruction (operation). The active application refers to the application 120 currently displayed on the screen of the operation panel 15 of the image forming apparatus 10 (i.e., the application 120 that can be currently operated via the operation panel 15).

Figure 4:
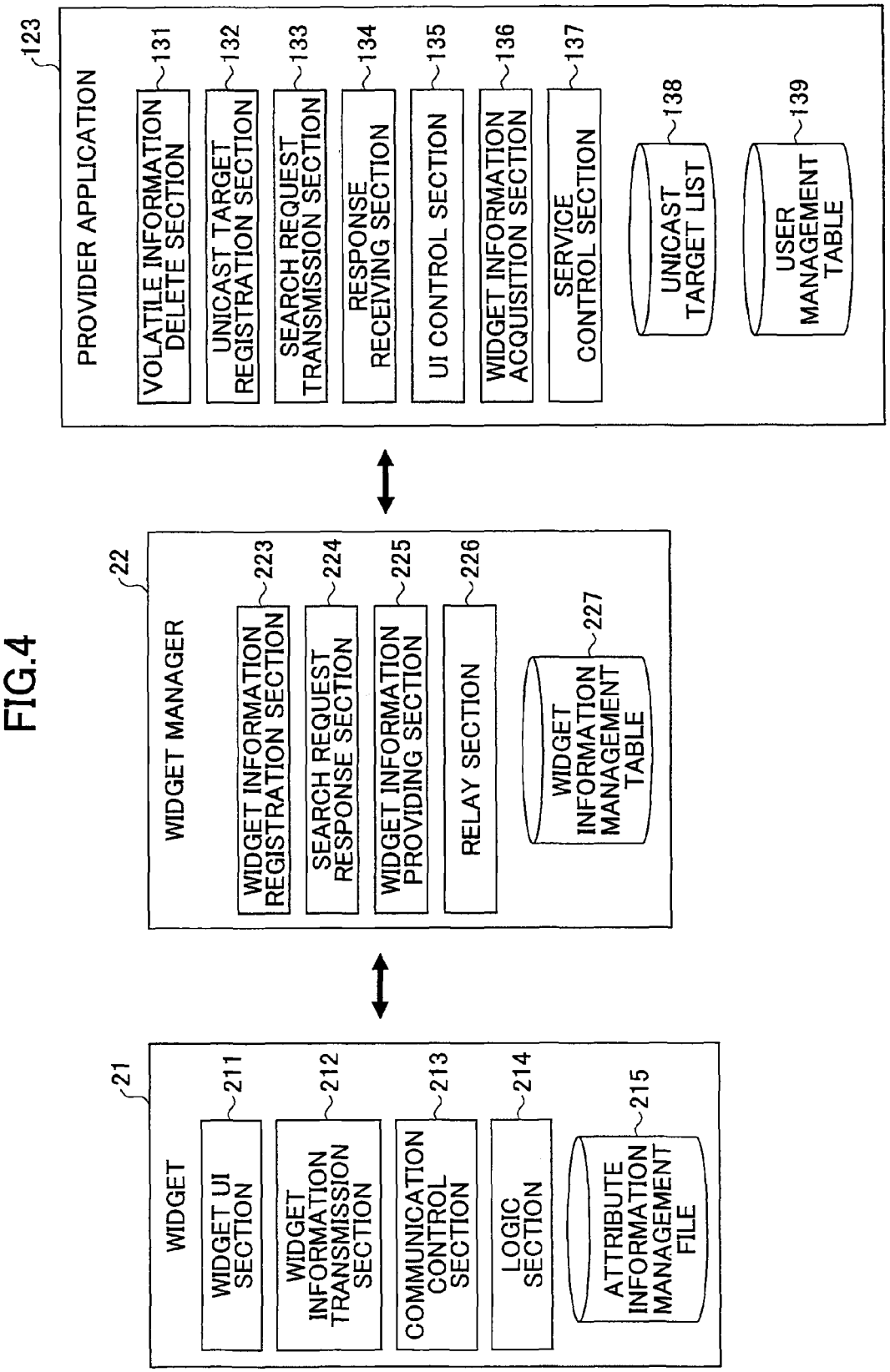
FIG. 4 is an exemplary functional block diagram of a widget, a widget manager, and a provider application according to a first embodiment of the present invention.

FIG. 4 shows an exemplary configuration of the widget 21, the widget manager 22, and the provider application 123 according to a first embodiment of the present invention.

As shown in FIG. 4, the widget 21 includes a widget UI (User Interface) section 211, a widget information transmission section 212, a communication control section 213, a logic section 214, and an attribute information management file 215.

The widget UI section 211 performs control so that various display menus of the widgets 21 are appropriately displayed on a display device of the user terminal 20. The widget information transmission section 212 transmits a request for the registration of widget information when the widget 21 is activated (started up), the widget information including information needed to execute the widget 21. The communication control section 213 controls communications (exchange of information) between the widget 21 and the widget manager 22 in the user terminal 20. The attribute information management file 215 stores setting information of the widget 21 and the like. The logic section 214 is a part where functions specific to the widgets 21 are implemented.

Further, as shown in FIG. 4, the widget manager 22 includes a widget information registration section 223, a searching request response section 224, a widget information providing section 225, a relay section 226, and a widget information management table 227.

The widget information registration section 223 receives a request for registering the widget information, the request being transmitted from the widget 21. Then, the widget information registration section 223 stores the received widget information into the widget information management table 227. The widget information of the widgets 21 activated (operating) in the user terminal 20 is registered into the widget information management table 227. The widget information management table 227 is generated in a storage device of the user terminal 20.

The searching request response section 224 transmits response information in response to a request for searching (search request) for the widget manager 22, the search request having been transmitted in the network 40 or 50 from the provider application 123 by using a multicast or unicast method. The response information includes identification information (e.g., host name or IP address) of the user terminal 20 in which the widget manager 22 is started (activated), identification information of the widget manager 22 (e.g., URL (Uniform Resource Locator)), identification information (e.g., user ID or user name) of the login user of the user terminal 20 or the like. For simplification purposes, in this embodiment, it is assumed that there is one-to-one relationship between the user terminal 20 and the user. Therefore, the response information from the searching request response section 224 may be restated as the information to be used for reporting the existence of the user accessible to the widget 21 to the image forming apparatus 10.

In response to the request from the image forming apparatus 10, the widget information providing section 225 provides (transmits) the widget information to the image forming apparatus 10, the widget information being registered in the widget information management table 227. The relay section 226 relays communications between the widget 21 and the provider application 123.

As shown in FIG. 4, the provider application 123 includes a volatile information delete section 131, a unicast target registration section 132, a search request transmission section 133, a response receiving section 134, a UI control section 135, a widget information acquisition section 136, a service control section 137, a unicast target list 138, and a user management table 139.

The volatile information delete section 131 deletes (clears) the information stored in the RAM 112 (e.g., the user management table 139) at a predetermined timing. The unicast target registration section 132 receives a request for the registration of the identification information of the user terminal 20 or the widget manager 22 as the target to be searched for by using the unicast method, and then registers (stores) the identification information in the unicast target list 138. In the first embodiment, the unicast target list 138 is generated (stored) in the RAM 112. The search request transmission section 133 transmits a request for searching (search request) for the widget manager 22 (namely, a request for searching for the user or the user terminal 20 in which the widget manager 22 is started (activated)) in the networks 40 and 50. In this regard, according to this embodiment, the widget manager 22 or the user having started (accessible to) the widget manager 22 corresponds to a predetermined resource to be searched for. The search request transmission section 133 transmits the search request in the network 40 (i.e., the segment of the image forming apparatus 10) by using the multicast method. However, instead of using the multicast method, a broadcast method may be used. On the other hand, the search request transmission section 133 transmits the search request in the network 50 (i.e., another segment other than the segment of the image forming apparatus 10) by using the unicast method. This is because the effective range (accessible range) by using the multicast method and the broadcast method is limited to the same segment as that of image forming apparatus 10. Because of this limitation, the identification information of the user terminal 20 or the widget manager 22 to be searched for in the network 50 is stored in advance in the unicast target list 138 by the unicast target registration section 132.

The response receiving section 134 registers (stores) the response information in the user management table 139, the response information having been received in response to the search request. The user management table 139 includes (manages) a list of users who have started (have access to) the widget manager 22 in the networks 40 and 50. The user management table 139 is generated (stored) in the RAM 112. The UI control section 135 receives an operation instruction input to the widget 21 from the user. Namely, the widget 21 is stored in the user terminal 20, but may be remotely operated from the operation panel 15 of the image forming apparatus 10. The widget information acquisition section 136 acquires the widget information of the widget 21 from the widget manager 22, the widget 21 belonging to the widget manager 22 of the user selected as a search target from among the users registered in the user management table 139.

The service control section 137 controls the execution of the service (e.g., scanning or printing) requested by the widget 21. The process to be executed to provide the service is delegated to, for example, the scanning application 121 or the printing application 122.

Figure 5:
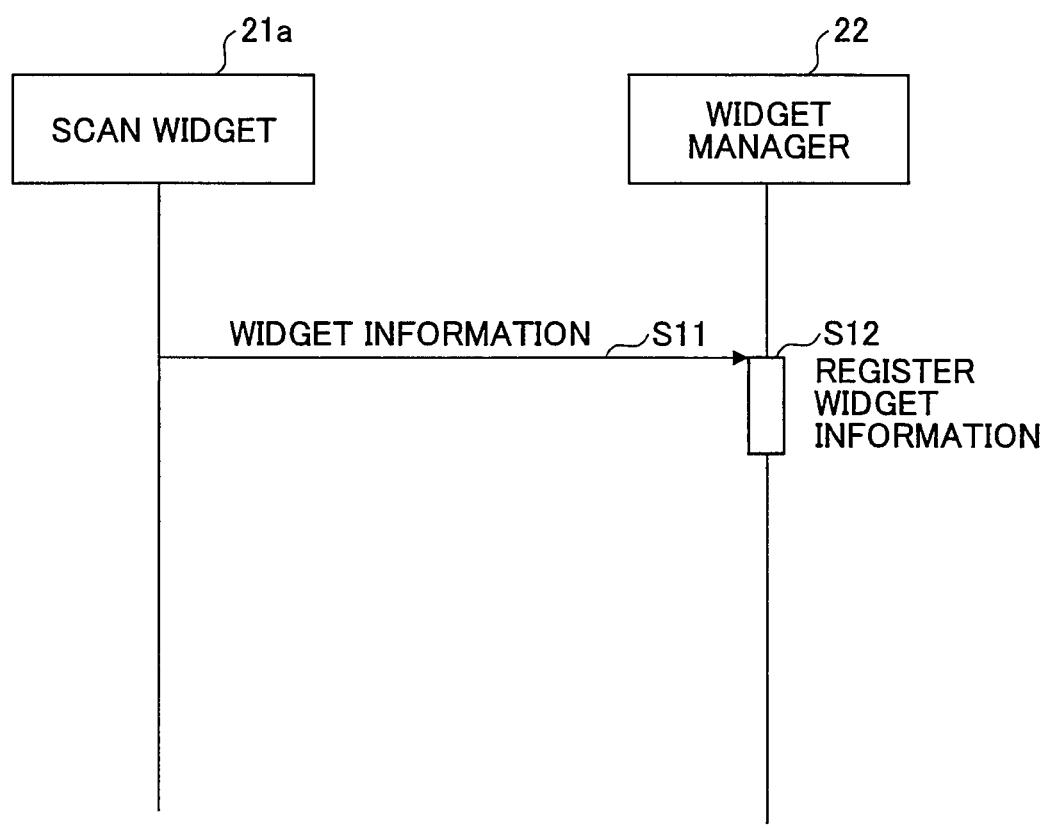
FIG. 5 is a sequence diagram illustrating a procedure performed when a widget in the user terminal starts up.

In the following, a processing procedure of the information processing system 1 is described. FIG. 5 is a sequence diagram showing the procedure when the widget 21 of the user terminal 20 is started up. In the initial condition in FIG. 5, it is assumed that the widget manager 22 has been already started up (activated).

For example, in response to the instruction input from the user, when the scan widget 21a is started up (activated), the widget information transmission section 212 of the scan widget 21a acquires the widget information from the attribute information management file 215, and transmits the acquired widget information to the widget information registration section 223 of the widget manager 22 (step S11).

FIG. 6 shows an example of the widget information of the scan widget 21a. As shown in FIG. 6, the widget information of the scan widget 21a may include a widget ID, user ID, widget address, display name, service ID, and setting information.

The widget ID is identification information uniquely identifying the widget 21. The user ID is an identifier of the user capable of accessing the scan widget 21a. Namely, the widget 21 is associated with the user of the user terminal 20 in which the widget 21 is installed. The widget address is identification information (such as the URL) uniquely identifying the widget 21 in network communications. The display name is a character string used for displaying the name of the scan widget 21a. The service ID is an identifier of the service requested from the scan widget 21a to the image forming apparatus 10 so that the service is provided by the image forming apparatus 10. For example, the service IDs "SCAN" and "PRINT" indicate the execution of the scanning process and the printing processes, respectively. Further, any other service ID may also be defined on an as-needed basis. The setting information indicates the information of the setting (executing conditions) for the service specified by the service ID. For example, when the service specified by the service ID is "SCAN", the setting information may include the settings of the resolution, color mode and the like. On the other hand, when the service specified by the service ID is "PRINT", the setting information may include the settings of the sheet size, color mode, scaling, single sided mode or double-sided printing mode and the like.

Further, as described above, the widget information is acquired from the attribute information management file 215. Therefore, by modifying the attribute information management file 215, the user may modify (customize) the setting conditions of the services.

Next, the widget information registration section 223 registers the widget information in the widget information management table 227 corresponding to the user ID included in the received widget information (step S12).

Further, when the user starts up (activates) another widget (e.g., the print widget 21b), similar to the procedure of FIG. 5, the widget information of the another widget is registered in the widget information management table 227 of the widget manager 22.

After starting a desired widget 21 in the user terminal 20, the user goes to the location of the image forming apparatus 10 to use the desired widget. In this case, when more than one image forming apparatuses 10 are in communication with the user terminal 20, the user may select any of the image forming apparatuses 10. Therefore, the user goes to one desired image forming apparatus 10 and uses the desired widget 21.

Next, a process performed based on the operations (instructions) of the user in the image forming apparatus 10 is described. FIGS. 7A and 7B are a sequence diagram illustrating a display process of displaying a user selection screen of the image forming apparatus according to the first embodiment of the present invention.

As shown in FIGS. 7A and 7B, when the image forming apparatus 10 is started (booted) up, the volatile information delete section 131 of the provider application 123 deletes all the information registered in the user management table 139 (clears the current contents of the user management table 139) (step S110).

After that, the unicast target registration section 132 of the provider application 123 receives requests from the remote terminals 20c and 20d (hereinafter collectively simplified as "remote terminal(s) 20" unless necessary to distinguish between the terminals), the requests being for registering the identification information (address information such as the IP addresses, the host names or the like) of the remote terminals 20 (steps S120 and 140). Then, the unicast target registration section 132 stores the received identification information in the unicast target list 138 (steps S130 and 150).

FIG. 8 shows an example of the unicast target list 138. In the example of FIG. 8, the IP addresses of the remote terminals 20 are registered. In the following description, a case is described where the IP address of the remote terminal 20 is registered in the unicast target list 138 as the identification information of the remote terminal 20 that is to be registered in the unicast target list 138. However, the present invention is not limited to this configuration. As the identification information of the remote terminals 20, any other appropriate information may be selected and used in accordance to the communication protocol to be used. Further, the identification information of the remote terminals 20 may be registered (input) in the unicast target list 138 via the operation panel 15.

After step S150, the image forming apparatus 10 is in wait for the input operation (instruction) by a user. Next, an operation (instruction) to execute the provider application 123 is input via the operation panel 15 by the user who has started the widget 21 in the user terminal 20 (step S160). Then, the search request transmission section 133 of the provider application 123 reads out (acquires) the IP address registered in the unicast target list 138 (step S170). Next, the volatile information delete section 131 of the provider application 123 deletes (clears) the contents of the user management table 139 (step S180). This deletion of the contents of the user management table 139 in step S180 corresponds to an initialization process before the widget manager 22 is searched for. The reason of the deletion of the contents of the user management table 139 is that, after step S160, when the provider application 123 is to be selected as the target to be executed, if there are remaining search results obtained in the past, the correct search result based on the latest search may not be displayed on the screen.

Next, the search request transmission section 133 transmits the search request to the acquired IP addresses in the network 50 by using the unicast method (steps S190 and S200). Then, the search request transmission section 133 transmits the search request in the network 400 by using the multicast method (steps S210 and S220). For example, the search request includes information indicating that the search request is to be transmitted (addressed) to the widget manager 22 by specifying the port number of the widget manager 22.

The searching request response section 224 of the widget manager 22 having been started in the user terminal 20 having received the search request transmits the response information in response to the search request. The response information may include the user ID of a login user, identification information of the user terminal 20 (IP address), and a URL for acquiring widget information. The URL for acquiring widget information uniquely identifies the widget manager 22 (i.e., user terminal 20). In the example of FIGS. 7A and 7B, the searching request response section 224 of the local terminal 20a transmits the response information, and then, similarly, the searching request response section 224 of the remote terminal 20c transmits the response information (steps S230 and S260). Upon the receipt of the response information, the response receiving section 134 of the provider application 123 registers (stores) the response information into the user management table 139 (steps S240 and S270).

FIG. 9 shows an exemplary configuration of the user management table 139. As shown in FIG. 9, the user management table 139 may include the user ID, the IP address, and the URL for acquiring widget information so as to be associated with each other. In the example of FIG. 9, the records (data) of users A and C are registered. The "USER A" refers to the user ID of the login user of the local terminal 20a, and the "USER C" refers to the user ID of the login user of the remote terminal 20c.

On the other hand, the UI control section 135 of the provider application 123 controls so that the user selection screen (list screen) is to be displayed on the operation panel 15 as an example of a display unit, and so that a button (display element) corresponding to the response information is to be displayed on the user selection screen (steps S250 and S280).

Figure 10:
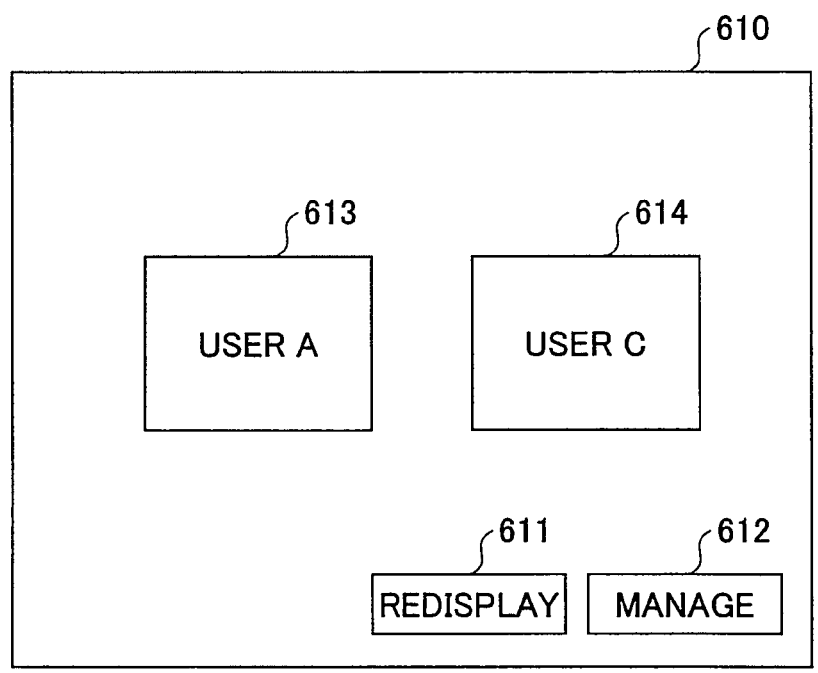
FIG. 10 is an example of a user selection screen.

FIG. 10 is an example of the user selection screen 610. As shown in FIG. 10, the user selection screen 610 displays buttons corresponding to the user IDs (response information). Further, the user selection screen 610 displays (includes) a button 613 corresponding to the user A and a button 614 corresponding to the user C. Further, the user selection screen 610 displays a redisplay button 611 and a manage button 612. The redisplay button 611 is used to repeatedly perform the processes after step 5170, and the manage button 612 is used to display a management screen. In the management screen, for example, various settings of the provider application 123 may be performed.

Further, the UI control section 135 controls so that whenever the response information is received (i.e., whenever the user management table 139 is registered (updated)), the button corresponding to the received response information is (immediately) added to the user selection screen 610. Therefore, for example, at step S250, the button 614 is not displayed yet. The display state of FIG. 10 actually corresponds to step S280.

After that, when a predetermined time period "t1" has passed since the search for the widget manager 22 is started (in step S160 or S190), the UI control section 135 controls to stop the update of the user selection screen 610. In other words, no buttons corresponding to the response information is added to the user selection screen 610, the response information being stored in the user management table 139 and being received after the predetermined time period "t1" has passed. By doing in this way, it may become possible to avoid the inconvenience that user selection screen 610 keeps on changing and does not become stable even after a long time period such as several seconds has passed. By avoiding the inconvenience, it may become possible to improve the operability of the user selection screen 610. For example, it may become possible to avoid an erroneous operation of pressing a wrong button (part) because the position of the button to be pressed has been suddenly changed (moved) due to the sudden addition of a new button.

However, even after the predetermined time period "t1" has passed, the registration to the user management table 139 continues. In the example of FIGS. 7A and 7B, the response information from the local terminal 20b and the remote terminal 20d are received after the predetermined time period "t1" has passed (steps S290 and S310), and the received response information are registered in the user management table 139 (steps S300 and S320).

After that, for example, when the manage button 612 is pressed, the screen to be displayed on the operation panel 15 is first changed into the management screen. Then, when an instruction is input to change the management screen into the user selection screen 610 again (step S330), the UI control section 135 controls to read out the response information from the user management table 139 (step S340), and change (update) the user selection screen 610 based on the response information read in step S340 (in step S350). At step S350 in FIG. 7B, four pieces of response information are registered in the user management table 139. Therefore, the buttons of the four users are displayed in the user selection screen 610 in step S350.

On the other hand, when the redisplay button 611 on the user selection screen 610 is pressed, the provider application 123 executes the processes after step S170 again. Therefore, the widget manager 22 is searched for again. In this case, unlike the case where the screen is returned to the user selection screen 610 (step S330), the buttons corresponding to the response information received before the predetermined time period "t1" has passed are displayed on the user selection screen 610.

Further, in the user selection screen 610 of FIG. 10, for example, when the user A presses the button 613 corresponding to the user A, the widget information acquisition section 136 transmits a request for acquiring the widget information to the URL for acquiring widget information of the response information corresponding to the button 613. This request for acquiring the widget information is received by the widget manager 22 of the local terminal 20a. The widget information providing section 225 of the widget manager 22 transmits the widget information (as shown in FIG. 6) registered in the widget information management table 227 to the widget information acquisition section 136. In response to the receipt of the widget information, the UI control section 135 controls to display a widget selection screen (not shown). In the widget selection screen, the buttons corresponding to the widgets 21 (i.e., the number of widget information) are displayed. In this embodiment, the button corresponding to the scan widget 21a is displayed. When this button is pressed by the user A, the service control section 137 recognizes that the scanning process is to be performed based on the service ID ("SCAN") of the widget information of the scan widget 21a, and controls to display a message on the operation panel 15, the message prompting the user to set a document to be scanned. When the user sets the document in the scanner 12, and then presses a start key in the operation panel 15, the service control section 137 delegates the scanning process to the scanning application 121. The scanning application 121 causes the scanner 12 to execute scanning, and outputs the scanned image data (scan image) to the service control section 137. The service control section 137 transmits the scan image to the widget address included in the widget information of the scan widget 21a. Upon receiving the scan image, the communication control section 213 of the scan widget 21a transmits (inputs) the scan image to the logic section 214. The logic section 214 performs a predetermined logic operation such as storing the scan data in the storage device of the user terminal 20a, transmitting (distributing) the storage device to another computer and the like.

Next, a second embodiment of the present invention is described. In the description of the second embodiment, only the parts different from those in the first embodiment of the present invention are mainly described. Therefore, it is assumed that the parts which are not particularly described in the second embodiment are the same as those in the first embodiment of the present invention.

Figure 11A:
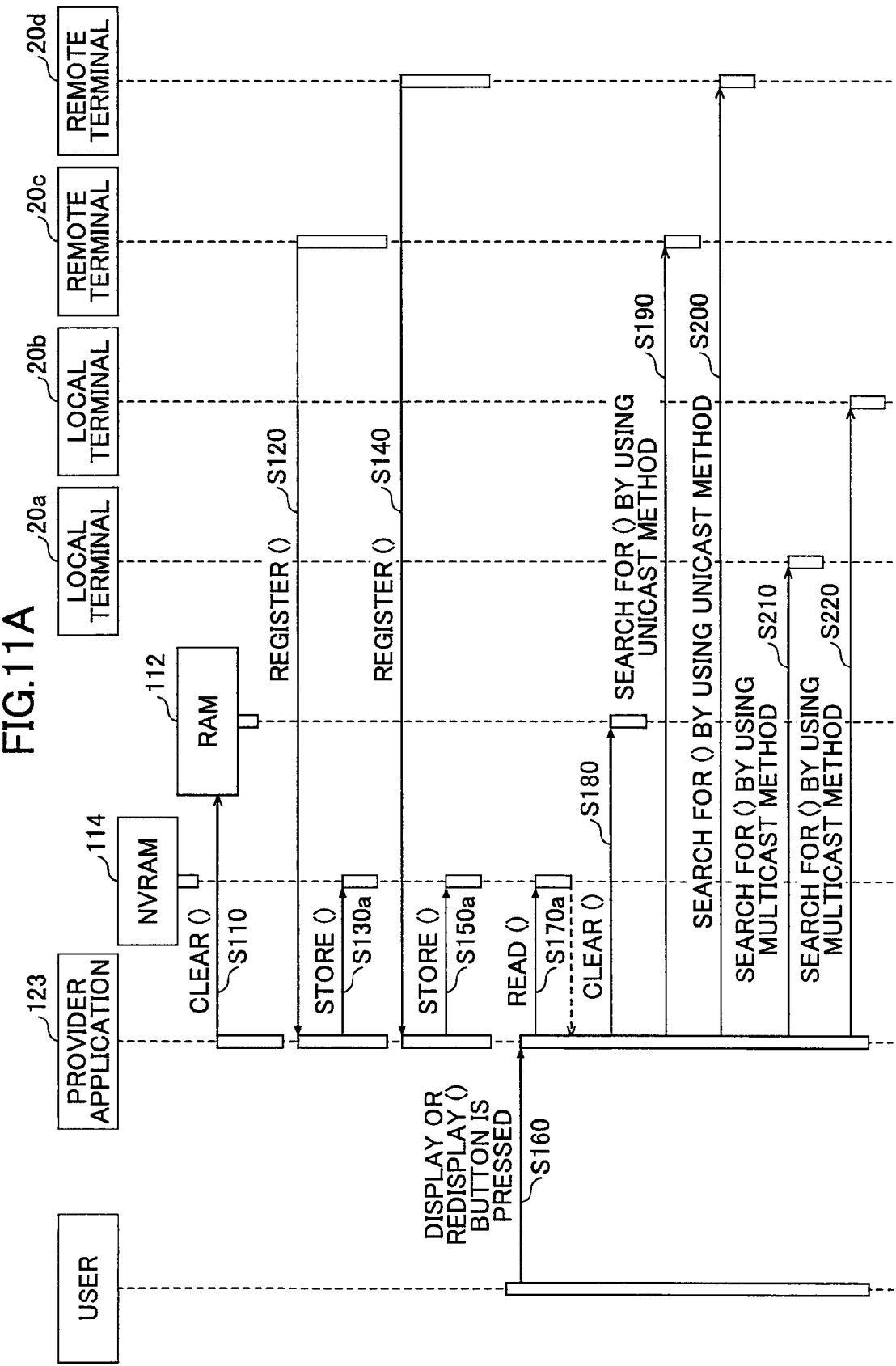

FIGS. 11A and 11B are a sequence diagram illustrating a display process of displaying the user selection screen of an image forming apparatus according to the second embodiment of the present invention. The same step numbers are used in FIGS. 11A and 11B to describe the same step numbers in FIGS. 7A and 7B, and the repeated description thereof may be omitted.

The configuration of the second embodiment is different from that of the first embodiment in that the unicast target list 138 is generated (stored) in the NVRAM 114. Therefore, in steps S130a and S150a, the unicast target registration section 132 stores the received IP address of the remote terminal 20 into the unicast target list 138 in the NVRAM 114. Further, in step S170a, the search request transmission section 133 reads out (acquires) the IP address registered in the unicast target list 138 in the NVRAM 114.

By storing the IP address of the remote terminal 20 in the NVRAM 114 which is a non-volatile storage medium, even when the power to the image forming apparatus 10 is turned OFF, the contents of the unicast target list 138 in the NVRAM 114 may be maintained. Because of this feature, it may not become necessary to perform a registration process to the unicast target list 138 each time when power to the image forming apparatus 10 is turned ON.

Next, a third embodiment of the present invention is described. In the description of the third embodiment, only the parts different from those in the second embodiment of the present invention are mainly described. Therefore, it is assumed that the parts not particularly described in the third embodiment are the same as those in the second embodiment of the present invention.

FIG. 12 is an exemplary functional block diagram of the widget 21, the widget manager 22, and the provider application 123 according to the third embodiment of the present invention. The same reference numerals are used in FIG. 12 to describe the components identical or equivalent to those shown in FIG. 4, and the repeated description thereof may be omitted.

In the third embodiment of the present invention, the provider application 123 further includes a unicast target moving section 141. The unicast target moving section 141 moves a part or all of the unicast target list 138 stored in the NVRAM 114 to the RAM 112 in accordance with a predetermined condition.

Figure 13B:
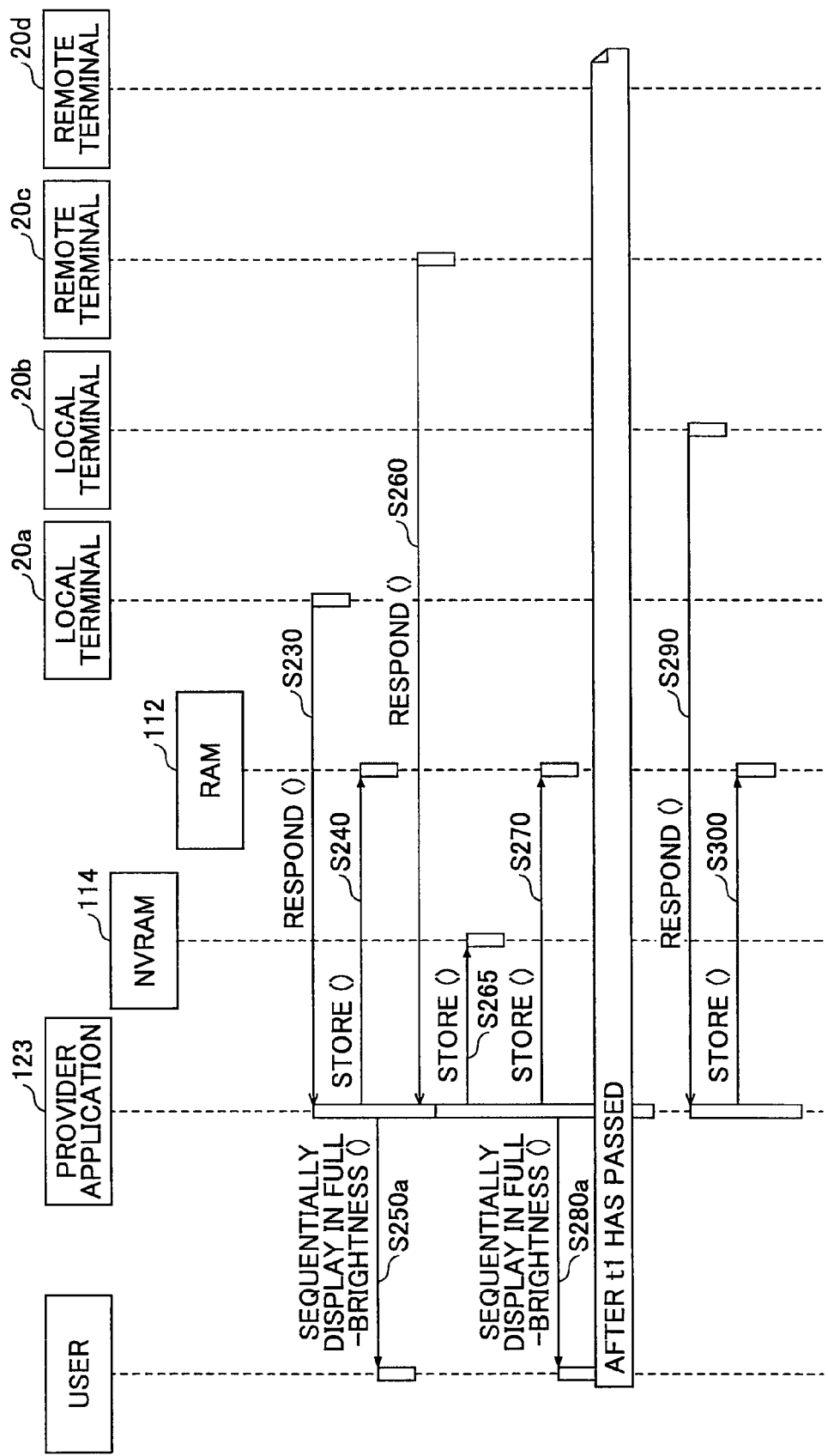

FIGS. 13A through 13C are a sequence diagram illustrating a display process of displaying the user selection screen of an image forming apparatus according to the third embodiment of the present invention. The same step numbers are used in FIGS. 13A through 13C to describe the same step numbers in FIGS. 11A and 11B, and the repeated description thereof may be omitted.

In the third embodiment, for example, the button corresponding to the widget manager 22 having been searched for (detected) in the previous search is first displayed in half-brightness. After that, when the widget manager 22 is searched for (detected) in the current search, the display of the button corresponding to the widget manager 22 having been searched for (detected) in the current search is switched from half-brightness to full-brightness.

To realize this function, when an instruction is input via the operation panel 15 to execute the provider application 123 (step S160), the UI control section 135 reads out the response information registered in the user management table 139 (step S165). The response information registered in the user management table 139 at step S165 is the response information having been received in the previous search (i.e., the response information of the widget manager 22 having been searched for (detected) in the previous search). Next, the UI control section 135 controls so that the button corresponding to the read response information is displayed in half-brightness in the user selection screen 610 (step S167).

After that, until the predetermined time period "t1" has passed, each time when the response information is received in response to the search request, the UI control section 135 controls so that the button corresponding to the received response information is displayed in full-brightness in the user selection screen 610 (steps S250a and S280a). In this case, when the button corresponding to the received response information is already displayed in half-brightness, UI control section 135 controls so that the display of the button is switched from half-brightness to full-brightness. Namely, it never occurs that, for example, there are two buttons displayed corresponding to the same resource and one button is displayed in half-brightness and the other button is displayed in full-brightness.

By displaying the button to be displayed in half-brightness based on the result of the previous search before the current search, a user may recognize the position of a desired button to be selected (pushed) during the current search. As a result, for example, the user may easily select (press) the desired button as soon as the display of the desired button is switched from half-brightness to full-brightness.

Further, in this third embodiment, if there is the response information that corresponds to the IP address registered in the unicast target list 138 and that has not yet been received when a predetermined time period "t2" longer than the predetermined time period "t1" has passed, the IP address is removed (deleted) from the unicast target list 138. Namely, in this case, it is assumed that the user terminal 20 corresponding to the IP address no longer exists for some reason such as the change of the network configuration, and the IP address is removed from the list of the targets to be searched for by using the unicast method. However, there may be a case that the receipt of the response information is delayed for, for example, some temporary reason. To correspond to this case, the IP address is removed from the unicast target list 138 only when the response information corresponding to the IP address has not been received within the predetermined time period "t2" for the second time in a row.

To realize this function, when the predetermined time period "t2" has passed since the searching for the widget manager 22 starts (step S160 or step S190), the unicast target moving section 141 reads out all the IP addresses registered in the unicast target list 138 in the NVRAM 114 (step S360). Herein, the IP addresses read out in step S360 is called "unicast IP address group". Next, the unicast target moving section 141 reads out all the IP addresses registered in the user management table 139 in the RAM 112 (i.e. the IP addresses included in the response information having been received during the current search) (step S370). Herein, the IP addresses read out in step S370 is called "responded IP address group". Next, the unicast target moving section 141 removes the IP addresses that are included in the "unicast IP address group" and that are not included in the "responded IP address group" (hereinafter the IP addresses are referred to as "not-responded IP address group") from the unicast target list 138 in the NVRAM 114 (step S380). Then, the unicast target moving section 141 generates (stores) a temporary unicast target list (hereinafter "temporary unicast target list") in the RAM 112, the temporary unicast target list having the not-responded IP address group as the elements (entries).

The IP addresses stored in the "temporary unicast target list" are read out by the search request transmission section 133 (step S172). Then, the search request transmission section 133 transmits a request for searching for the IP addresses read out from the "temporary unicast target list" by using the unicast method.

Further, "temporary unicast target list" is removed from the RAM 112 by the volatile information delete section 131 (step S180*a*). As a result, the IP addresses registered in the "temporary unicast target list" are not registered in any of the unicast target list 138 and the "temporary unicast target list" at step S180*a*. However, in this third embodiment, upon receiving the response information in response to the search request by using the unicast method (i.e., the response information from the remote terminal 20), the response receiving section 134 stores the IP address included in the response information into the unicast target list 138 in the NVRAM 114 (steps S265 and S315). Therefore, the IP address first transferred to the "temporary unicast target list" is returned to the unicast target list 138 as long as the response information corresponding to the IP address is received (detected) in the next search. However, if the response information corresponding to the IP address is not received (detected) in the next search, since the "temporary unicast target list" is deleted, the IP address is no longer to be searched for.

As described above, by updating the unicast target list 138 depending on whether the response information is received (detected), the widget manager 22 (user terminal 20) which no longer exists in the networks may be removed from the list of the targets to be searched for. As a result, it may become possible to improve the efficiency of the search process, reduce the network load and the like. Further, as described above, the widget manager 22 (user terminal 20) is not removed (deleted) from the list of the targets to be searched for when the response information corresponding to the widget manager 22 (user terminal 20) is not received only once; and the widget manager 22 (user terminal 20) is removed only when the response information has not been received for the second time in a row. By deleting in this way, it may become possible to appropriately avoid the case where the widget manager 22 (user terminal 20) is improperly removed because the response information corresponding to the widget manager 22 (user terminal 20) is not received due to a temporary reason.

Next, a fourth embodiment of the present invention is described. In the description of the fourth embodiment, only the parts different from those in the second embodiment of the present invention are mainly described. Therefore, it is assumed that the parts which are not particularly described in the fourth embodiment are the same as those in the second embodiment of the present invention.

Figure 14A:
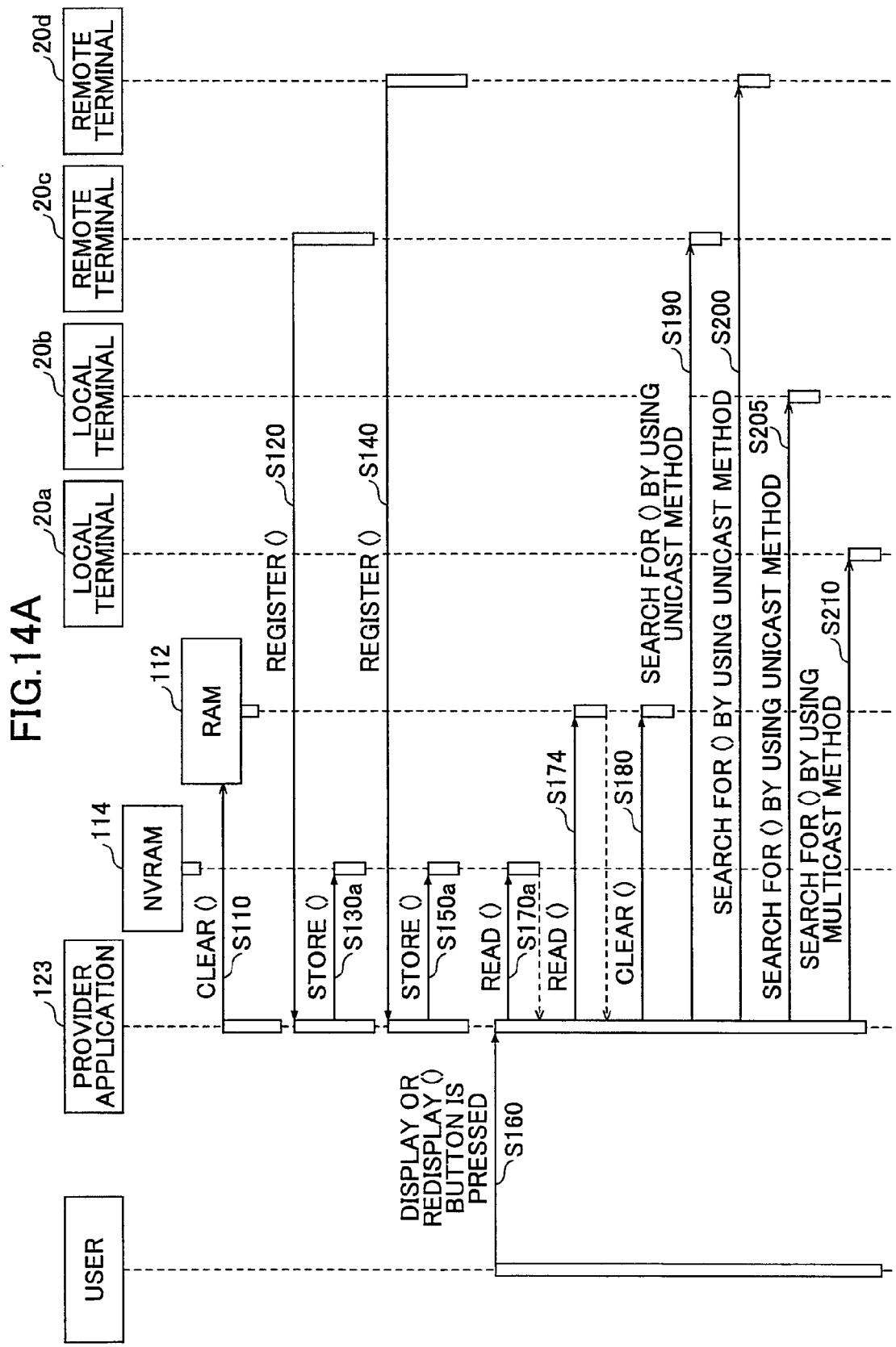
FIGS. 14A and 14B are a sequence diagram illustrating a display process of displaying the user selection screen of an image forming apparatus according to a fourth embodiment of the present invention.
Figure 14B:
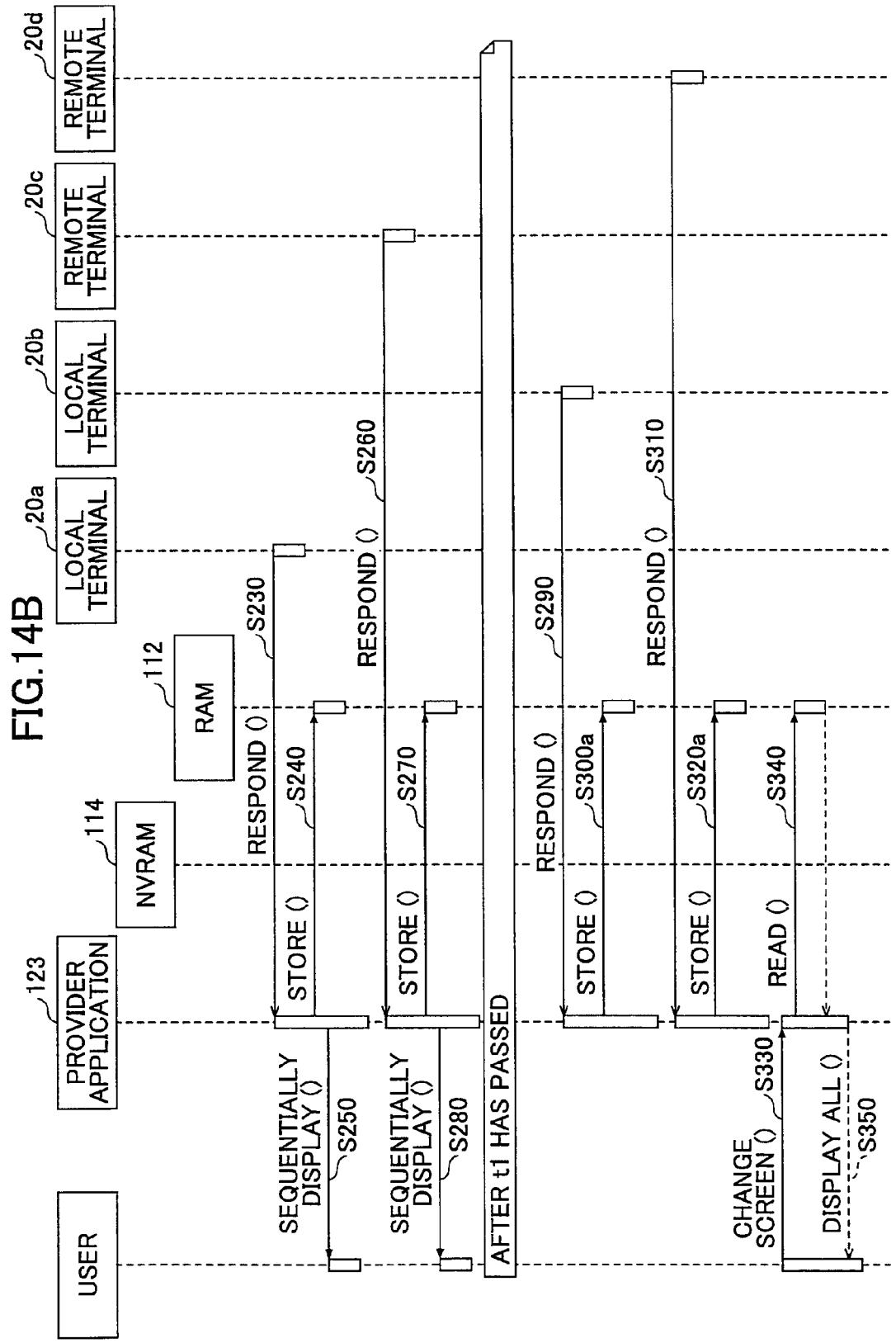

FIGS. 14A and 14B are a sequence diagram illustrating a display process of displaying the user selection screen of an image forming apparatus according to the fourth embodiment of the present invention. The same step numbers are used in FIGS. 14A and 14B to describe the same step numbers in FIGS. 11A and 11B, and the repeated description thereof may be omitted.

In the fourth embodiment, when the response information of a local terminal 20 is received after the predetermined time period "t1" has passed, the local terminal 20 is searched for by using the unicast method in the next search.

To realize this function, when the response information is received after the predetermined time period "t1" has passed, the response receiving section 134 adds a delay flag to the received response information, and registers (stores) the response information with the delay flag in the user management table 139. In the example of FIGS. 14A and 14B, the delay flags are added to the response information (from the local terminal 20*b*) to be registered in step S300*a* and the response information (from the remote terminal 20*d*) to be registered in step S320*a*. The delay flag is the information indicating that it took more than the predetermined period "t1" to receive the response information.

FIG. 15 shows an exemplary configuration of the user management table 139 according to the forth embodiment of the present invention. The same terms are used in FIG. 15 to describe the components identical to those shown in FIG. 9, and the repeated description thereof may be omitted.

In the user management table 139 of FIG. 15, a column for the delay flag is added as an item of the user management table 139. In the example of FIG. 15, the data of the delay flag for the user B and the user D is "ON". The "USER B" is the user ID of the login user of the local terminal 20*b*, and the "USER D" is the user ID of the login user of the remote terminal 20*d*. In this case, the state in which the delay flag indicates "ON" is substantially equivalent to that the delay flag is added; and the state in which the delay flag indicates "OFF" is substantially equivalent to that the delay flag is not added.

This delay flag is used in step S174. Namely, in step S174, the search request transmission section 133 reads out the IP addresses to which the delay flag is added (the delay flag indicates "ON") from the user management table 139. When the IP address to which the delay flag is added is the IP address for the local terminal 20, the search request transmission section 133 transmits the search request to the IP address by using the unicast method (step S205). In this case, the search request transmission section 133 transmits the search request by using the unicast method first, and transmits the search request by using the multicast method. By transmitting the search requests by using the unicast method first and followed by transmitting the search request by using the multicast method in this order, it may become possible to increase the probability of receiving a quicker response from the local terminal 20*b* that was delayed in the previous response. As a result, it may also become possible to increase the probability of displaying the button corresponding to the local terminal 20*b* in the user selection screen 610 within the predetermined time period "t1". Further, in this case, whether the IP address is for the local terminal 20 or the remote terminal 20 may be determined based on the network address of the IP address.

In this case, the remote terminal 20*d* is already searched for by using the unicast method. Therefore, unlike the case of the local terminal, it is not necessary to perform a changing process so as to regard the remote terminal 20 as the target to be searched for by using the unicast method. However, when the possibility of the delay of the response information from the remote terminal 20*d* can be reduced, it may become possible to accordingly increase the probability of quicker display of the button corresponding to the remote terminal 20*d*.

To that end, after step S174, the search request transmission section 133 determines the existence of the IP address that is included in the unicast target list 138 and to which the delay flag is added (hereinafter "delay remote IP address"). When determining the existence of the "delay remote IP address", the search request transmission section 133 puts a higher priority on transmitting a search request to the "delay remote IP address" than transmitting a search request to the other IP address by using the unicast or multicast method. In the example of FIGS. 14A and 14B, first, a search request to the remote terminal 20d is transmitted by using the unicast method. Alternatively, the other search requests by using the unicast and multicast methods may be transmitted after a predetermined time period has passed since the search request to the remote terminal 20d is transmitted by using the unicast method.

Next, a fifth embodiment of the present invention is described. In the description of the fifth embodiment, only the parts different from those in the second embodiment of the present invention are mainly described. Therefore, it is assumed that the parts which are not particularly described in the fifth embodiment are the same as those in the second embodiment of the present invention.

FIG. 16 shows an exemplary configuration of the widget 21, the widget manager 22, and the provider application 123 according to the fifth embodiment of the present invention.

As shown in FIG. 16, the provider application 123 further includes a unicast target adding section 142. When determining that the selected (pressed) button in the user selection screen 610 corresponds to the local terminal 20 (response information from the local terminal 20), the unicast target adding section 142 adds the IP address included in the response information to the unicast target list 138 in the NVRAM 114.

Figure 17A:
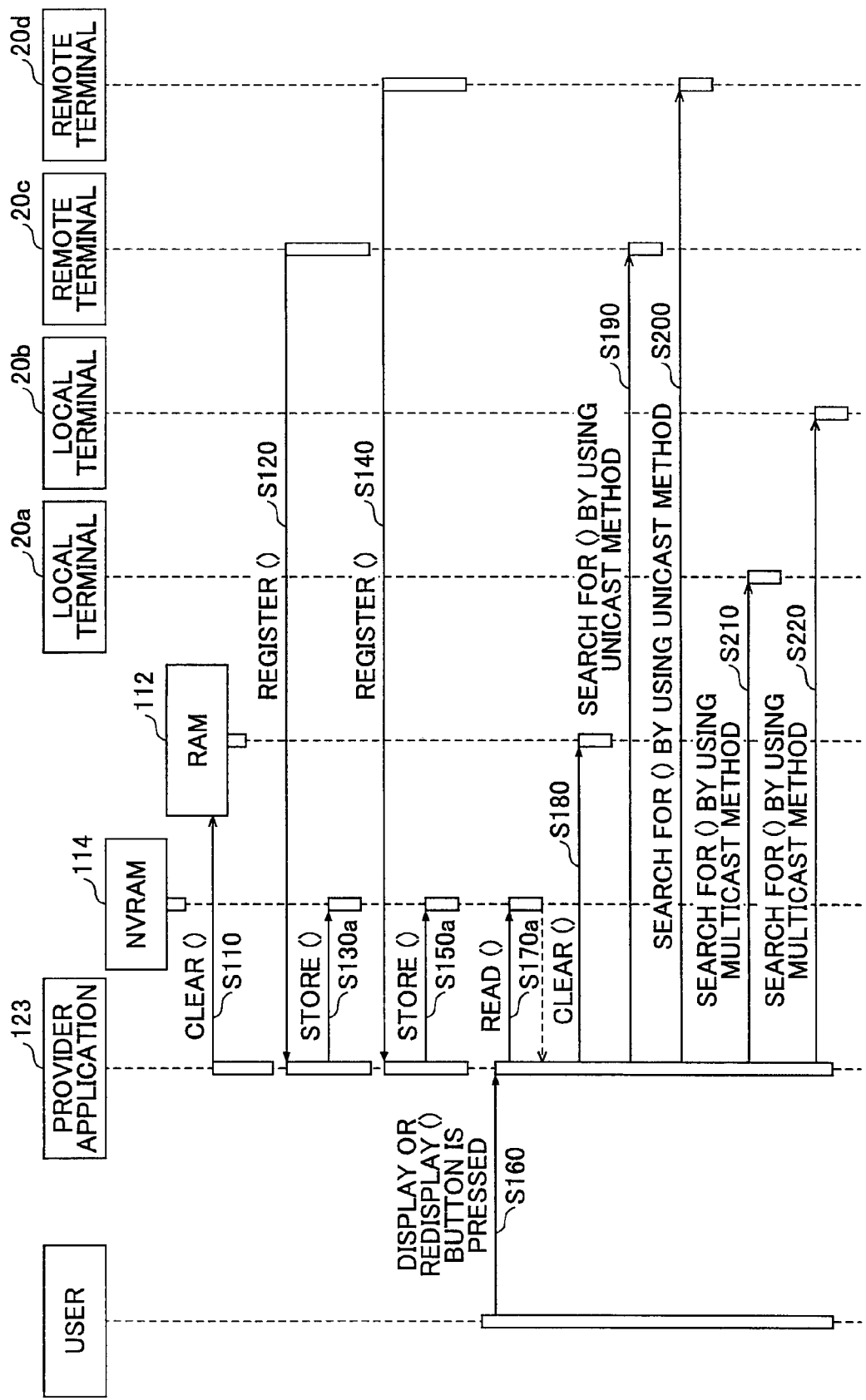
FIGS. 17A and 17B are a sequence diagram illustrating a display process of displaying the user selection screen of an image forming apparatus according to the fifth embodiment of the present invention.
Figure 17B:
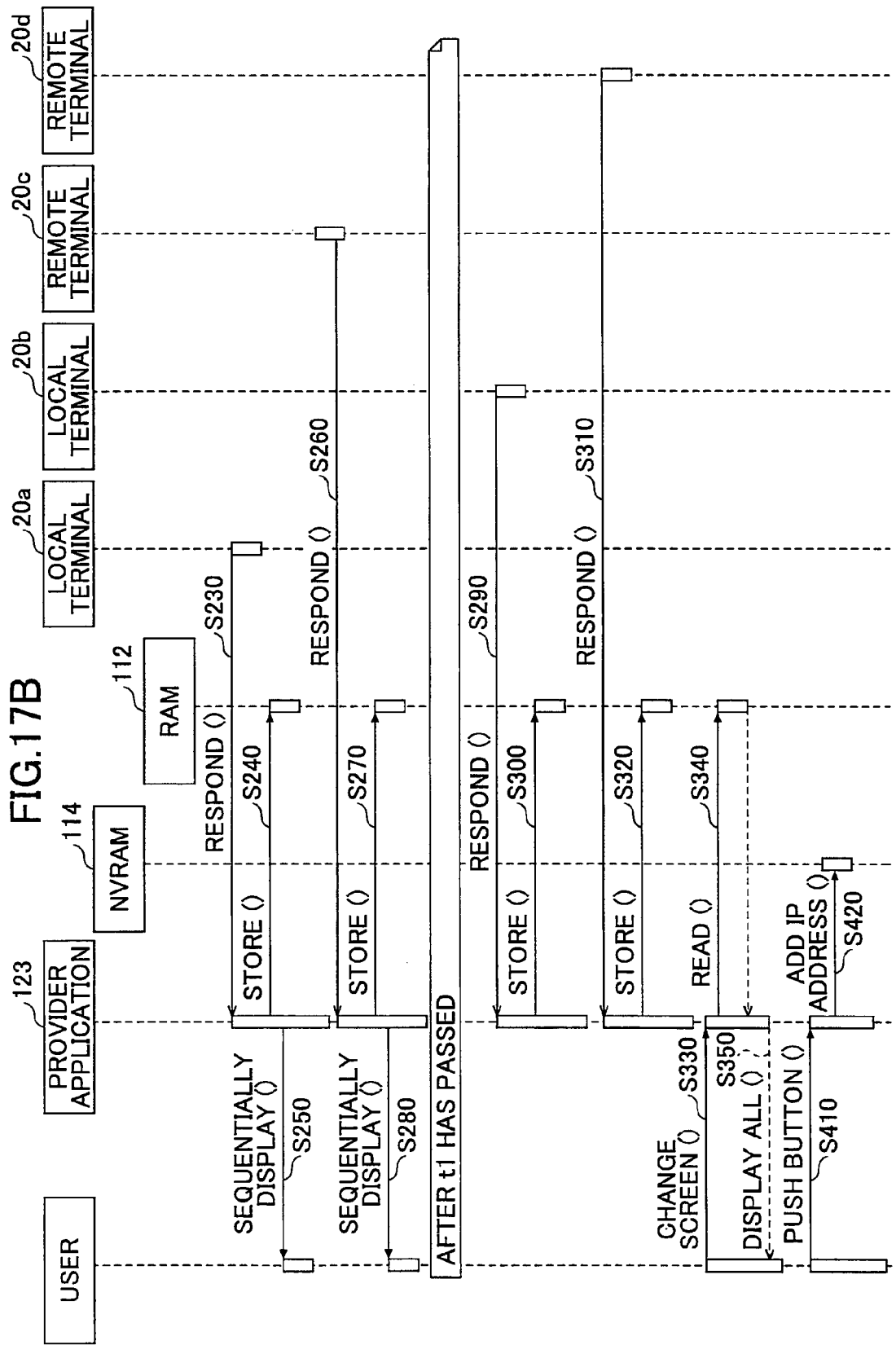

FIGS. 17A and 17B are a sequence diagram illustrating a display process of displaying the user selection screen of an image forming apparatus according to the fifth embodiment of the present invention. The same step numbers are used in FIGS. 17A and 17B to describe the same step numbers in FIGS. 11A and 11B, and the repeated description thereof may be omitted.

In FIGS. 17A and 17B, steps after step S410 are added to the sequence diagram. In a case where the user selection screen 610 is displayed on the operation panel 15, when a button in the user selection screen 610 is pressed, the unicast target adding section 142 determines whether the button corresponds to the local terminal 20 based on the IP address included in the response information corresponding to the pressed button (step S410). When determining that the button corresponds to the local terminal 20, the unicast target adding section 142 adds the IP address included in the response information to the unicast target list 138 in the NVRAM 114 (step S420).

As a result, in the next search, the widget manager 22 of the local terminal 20 corresponding to the IP address is searched for by using the unicast method. This is because the search request transmission section 133 transmits the search request to the IP address stored in the unicast target list 138 by using the unicast method.

As described above, according to the fifth embodiment of the present invention, the widget manager 22 used by a user is searched for by using the unicast method from the next search. Therefore, it may become possible to increase the probability of detecting the widget manager 22 that is more likely to be used by a user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    a search request transmission unit configured to transmit a search request to a predetermined resource in a network;
    a response receiving unit configured to receive response information in response to the search request, and store the received response information in a storage unit;
    a list screen display control unit configured to cause a display unit to display a list screen including a display element corresponding to each response information stored in the storage unit within a first predetermined time period since the transmission of the search request, wherein
    when the list screen is changed to another screen and then changed back again to the list screen, the list screen display control unit causes the display unit to display the list screen in a manner such that the list screen includes the display element corresponding to each response information stored in the storage unit within the first predetermined time period and each response information stored in the storage unit after the first predetermined time period has passed,
    the search request transmission unit transmits the search requests by using a multicast method and by using a unicast method to address information stored in a non-volatile storage unit,
    the response receiving unit stores the response information in a volatile storage unit,
    the list screen display control unit causes the display unit to display the list screen based on the response information stored in the volatile storage unit,
    the image forming apparatus further comprises:
        a deletion unit configured to delete the response information stored in the volatile storage unit each time when the predetermined resource is searched for,
        a moving unit configured to, when there is the response information not having been stored in the volatile storage unit within a second predetermined time period longer than the first predetermined time period since the transmission of the search request using the unicast method, move the address information corresponding to the search request from the non-volatile storage unit to the volatile storage unit,
    the search request transmission unit transmits the search request by using the unicast method to address information having been moved to the volatile storage unit,
    the deletion unit deletes the address information having been moved to the volatile storage unit each time when being searched for; and
    when the response information in response to the search request by using the unicast method to the address information having been moved to the volatile storage unit is received within the second predetermined time period, the response receiving unit stores the address information in the non-volatile storage unit.

2. The image forming apparatus according to claim 1, wherein
    the response receiving unit adds delay identification information to the response information received after the first predetermined time period has passed in response to the search request by using the multicast method, and stores the response information in the volatile storage unit, and
    the search request transmission unit transmits the search request by using the unicast method to the address information included in the response information to which the delay identification information is attached.

3. The image forming apparatus according to claim 1, wherein the response receiving unit adds delay identification information to the address information of the response information received after the first predetermined time period has passed in response to the search request by using the unicast method, and the search request transmission unit first transmits the search request to the address information to which the delay identification information is attached, and transmits the search request to the other address information.

4. The image forming apparatus according to claim 1, further comprising:

a unicast target adding unit configured to store the address information in the non-volatile storage unit, the address information being included in the response information corresponding to the display element selected in the list screen.

5. A display control method executed in an image forming apparatus, the display control method comprising:

a search request transmission step of transmitting a search request to a predetermined resource in a network;

a response receiving step of receiving response information in response to the search request, and storing the received response information in a storage unit;

a list screen display control step of controlling a display unit to display a list screen including a display element corresponding to each response information stored in the storage unit within a first predetermined time period since the transmission of the search request, wherein when the list screen is changed to another screen and then changed back again to the list screen, in the list screen display control step, the display unit is controlled to display the list screen in a manner such that the list screen includes the display element corresponding to each response information stored in the storage unit within the first predetermined time period and each response information stored in the storage unit after the first predetermined time period has passed, the search request transmission step includes transmitting the search requests by using a multicast method and by using a unicast method to address information stored in a non-volatile storage unit, the response receiving step includes storing the response information in a volatile storage unit, the list screen display control step includes causing the display unit to display the list screen based on the response information stored in the volatile storage unit, the method further comprises:

a deletion step of deleting the response information stored in the volatile storage unit each time when the predetermined resource is searched for, a moving step of, when there is the response information not having been stored in the volatile storage unit within a second predetermined time period longer than the first predetermined time period since the transmission of the search request using the unicast method, moving the address information corresponding to the search request from the non-volatile storage unit to the volatile storage unit, the search request transmission step includes transmitting the search request by using the unicast method to address information having been moved to the volatile storage unit, the deletion step includes deleting the address information having been moved to the volatile storage unit each time when being searched for; and when the response information in response to the search request by using the unicast method to the address information having been moved to the volatile storage unit is received within the second predetermined time period, the response receiving step includes storing the address information in the non-volatile storage unit.

6. A non-transitory computer readable recording medium comprising a program encoded and stored in a computer readable format to cause a computer to execute a display control method comprising:

a search request transmission step of transmitting a search request to a predetermined resource in a network;

a response receiving step of receiving response information in response to the search request, and storing the received response information in a storage unit;

a list screen display control step of controlling a display unit to display a list screen including a display element corresponding to each response information stored in the storage unit within a first predetermined time period since the transmission of the search request, wherein when the list screen is changed to another screen and then changed back again to the list screen, in the list screen display control step, the display unit is controlled to display the list screen in a manner such that the list screen includes the display element corresponding to each response information stored in the storage unit within the first predetermined time period and each response information stored in the storage unit after the first predetermined time period has passed, the search request transmission step includes transmitting the search requests by using a multicast method and by using a unicast method to address information stored in a non-volatile storage unit, the response receiving step includes storing the response information in a volatile storage unit, the list screen display control step includes causing the display unit to display the list screen based on the response information stored in the volatile storage unit, the method further comprises:

a deletion step of deleting the response information stored in the volatile storage unit each time when the predetermined resource is searched for, a moving step of, when there is the response information not having been stored in the volatile storage unit within a second predetermined time period longer than the first predetermined time period since the transmission of the search request using the unicast method, moving the address information corresponding to the search request from the non-volatile storage unit to the volatile storage unit, the search request transmission step includes transmitting the search request by using the unicast method to address information having been moved to the volatile storage unit, the deletion step includes deleting the address information having been moved to the volatile storage unit each time when being searched for; and when the response information in response to the search request by using the unicast method to the address information having been moved to the volatile storage unit is received within the second predetermined time period, the response receiving step includes storing the address information in the non-volatile storage unit.

7. The image forming apparatus according to claim 1, wherein the response receiving unit continues to receive and store the received response information in response to the search request after the first predetermined time period has passed.

8. The image forming apparatus according to claim 1, wherein the list screen display control unit displays the display element corresponding to each response information stored in the storage unit within the first predetermined time period immediately after it is stored in the storage unit.

9. The image forming apparatus according to claim 1, wherein each response information stored in the storage unit after the first predetermined time period has passed are not included in the list screen before the list screen is changed to another screen.

10. The image forming apparatus according to claim 1, wherein the search request transmission unit transmits the search requests by using a multicast method when the predetermined resource is located in a local network.

11. The image forming apparatus according to claim 1, wherein the search request transmission unit transmits the search requests by using a unicast method when the predetermined resource is located in a remote network.

12. The image forming apparatus according to claim 1, wherein
the search request transmission unit transmits the search requests by using a multicast method when the predetermined resource is located in a local network, and
the search request transmission unit transmits the search requests by using a unicast method when the predetermined resource is located in a remote network.

13. The image forming apparatus according to claim 10, wherein the local network is the network in which the image forming apparatus is connected.

14. The image forming apparatus according to claim 11, wherein the remote network is a network other than the network in which the image forming apparatus is connected.

15. The image forming apparatus according to claim 12, wherein
the local network is the network in which the image forming apparatus is connected, and
the remote network is a network other than the network in which the image forming apparatus is connected.

16. The image forming apparatus according to claim 1, wherein the response information includes at least identification information of the predetermined resource.

\* \* \* \* \*